(12) United States Patent
Zhou

(10) Patent No.: US 11,979,872 B2
(45) Date of Patent: May 7, 2024

(54) METHOD, DEVICE AND BASE STATION FOR TRANSMITTING INFORMATION

(71) Applicant: BEIJING XIAOMI MOBILE SOFTWARE CO., LTD., Beijing (CN)

(72) Inventor: Juejia Zhou, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 545 days.

(21) Appl. No.: 17/281,238

(22) PCT Filed: Sep. 29, 2018

(86) PCT No.: PCT/CN2018/108862
§ 371 (c)(1),
(2) Date: Mar. 29, 2021

(87) PCT Pub. No.: WO2020/062183
PCT Pub. Date: Apr. 2, 2020

(65) Prior Publication Data
US 2021/0410164 A1    Dec. 30, 2021

(51) Int. Cl.
*H04W 72/12* (2023.01)
*H04B 7/06* (2006.01)
(Continued)

(52) U.S. Cl.
CPC ...... *H04W 72/1268* (2013.01); *H04B 7/0617* (2013.01); *H04W 72/046* (2013.01); *H04W 74/0816* (2013.01)

(58) Field of Classification Search
CPC .......... H04W 72/1268; H04W 72/046; H04W 74/0816; H04W 72/23; H04W 74/006; H04W 74/0808; H04B 7/0617
See application file for complete search history.

(56) References Cited

U.S. PATENT DOCUMENTS

2015/0358827 A1    12/2015    Bendlin et al.
2017/0230968 A1    8/2017    Yu et al.
(Continued)

FOREIGN PATENT DOCUMENTS

CN    103813345 A    5/2014
CN    105264937 A    1/2016
(Continued)

OTHER PUBLICATIONS

State Intellectual Property Office of the People's Republic of China, Office Action and Search Report Issued in Application No. 201880001853.3, Oct. 8, 2022, (Submitted with Machine/Partial Translation), (13p).

(Continued)

*Primary Examiner* — John D Blanton
(74) *Attorney, Agent, or Firm* — Arch & Lake LLP

(57) ABSTRACT

A method of transmitting information, applicable to a base station, and comprising: determining a participating terminal group, each participating terminal UE of the participating terminal group sharing a periodic uplink transmission resource in the same grant-free uplink transmission period in an unlicensed spectrum; and determining shared grant-free uplink transmission configuration information for the participating terminal group, wherein the shared grant-free uplink transmission configuration information is configured to instruct each participating terminal of the participating terminal group to perform uplink transmission automatically according to a preset periodic uplink transmission resource in the unlicensed spectrum. A base station is further provided.

15 Claims, 11 Drawing Sheets

(51) Int. Cl.
*H04W 72/044* (2023.01)
*H04W 72/1268* (2023.01)
*H04W 74/0816* (2024.01)

(56) References Cited

U.S. PATENT DOCUMENTS

| | | | |
|---|---|---|---|
| 2017/0311169 | A1 | 10/2017 | Cai et al. |
| 2018/0027554 | A1 | 1/2018 | Yerramalli et al. |
| 2018/0027575 | A1 | 1/2018 | Shi et al. |
| 2018/0152927 | A1 | 5/2018 | Kim et al. |
| 2019/0261338 | A1* | 8/2019 | Akkarakaran ........ H04W 72/21 |
| 2019/0327045 | A1* | 10/2019 | Zhang ............... H04W 72/0446 |

FOREIGN PATENT DOCUMENTS

| | | | | |
|---|---|---|---|---|
| CN | 105392206 | A | * 3/2016 | .......... H04W 72/121 |
| CN | 105392206 | A | 3/2016 | |
| CN | 105530647 | A | 4/2016 | |
| CN | 105792220 | A | 7/2016 | |
| CN | 105991224 | A | 10/2016 | |
| CN | 106658718 | A | 5/2017 | |
| CN | 106879076 | A | 6/2017 | |
| CN | 107734651 | A | 2/2018 | |
| CN | 107889114 | A | 4/2018 | |
| CN | 108365927 | A | 8/2018 | |
| CN | 108574987 | A | 9/2018 | |
| EP | 2482603 | A1 | 8/2012 | |
| WO | 2017125077 | A1 | 7/2017 | |
| WO | 2017206024 | A2 | 12/2017 | |
| WO | 2018021824 | A1 | 2/2018 | |
| WO | 2018128312 | A1 | 7/2018 | |
| WO | 2018171290 | A1 | 9/2018 | |

OTHER PUBLICATIONS

ISA State Intellectual Property Office of the People's Republic of China, Written Opinion of the International Searching Authority Issued in Application No. PCT/CN2018/108862, Jun. 28, 2019, WIPO, (7p).

NTT DOCOMO, TSG RAN WG1, "Status Report to TSG", 3GPP TSG RAN meeting #77, RP-171783, Sapporo, Japan, Sep. 11-14, 2017, (284p).

International Search Report issued in PCT Application No. PCT/CN2018/108862 dated Jun. 28, 2019 with English translation, (4p).

Xiaomi Communications, "SS/PBCH blocks transmission for NR unlicensed", 3GPP TSG RAN WG1 Meeting #93, R1-1807208, Busan, Korea, May 21-25, 2018, (2p).

State Intellectual Property Office of the People's Republic of China, Office Action and Search Report Issued in Application No. 2018800018533, May 31, 2023, 21 pages.(Submitted with Machine/Partial Translation).

LG Electronics, "Discussion on grant-free uplink transmission",3GPP TSG RAN WG1 Meeting #89, R1-1707655, Hangzhou, China May 14-19, 2017, 9 pages.

Huawei, HiSilicon, "Consideration on grant free transmission for NR", 3GPP TSG-RAN WG2 Meeting #95, R2-165442, Gothenburg, Sweden, Aug. 22-26, 2016, 3 pages.

Luoyu Qin et al, "Analytic Study of Radio Resource Management in Broadband Satellite Communication System", Space Electronic Technology, Feb. 25, 2017, 6 pages.

* cited by examiner

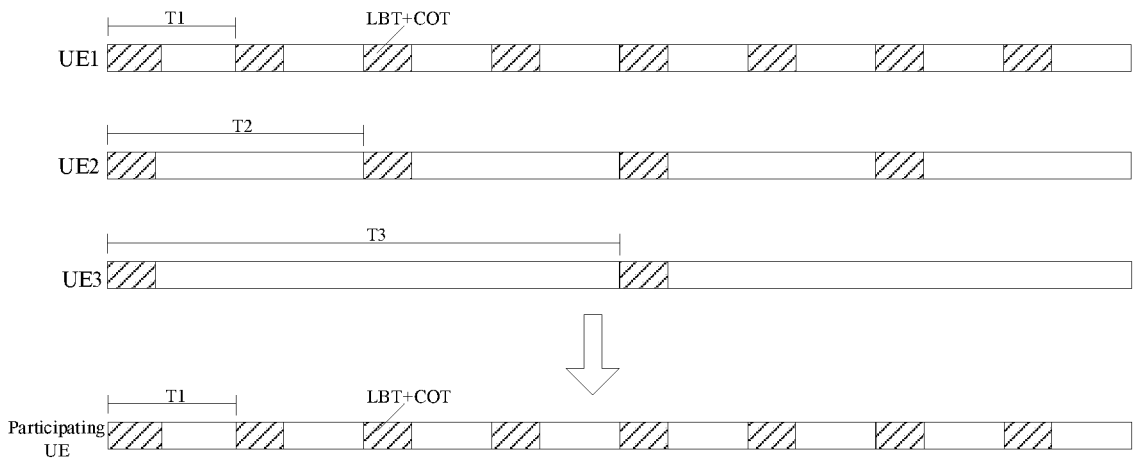

FIG. 13A

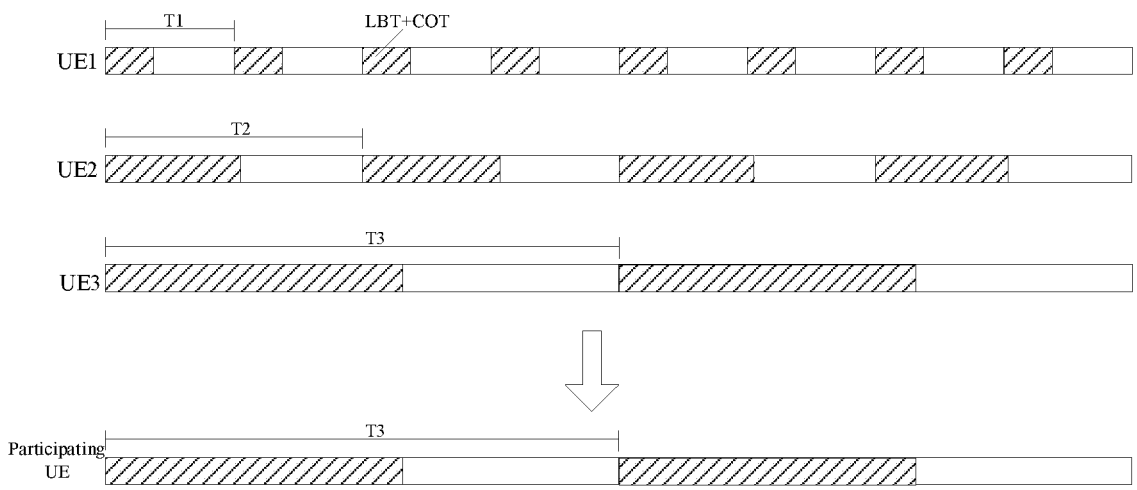

FIG. 13B

| Determining a participating terminal group, respective participating UEs of the participating terminal group sharing a periodic uplink transmission resource of a grant-free uplink transmission period in an unlicensed spectrum | — 11 |

| Determining shared grant-free uplink transmission configuration information of the original participating terminal group as shared grant-free uplink transmission configuration information of the updated participating terminal group | — 122 |

FIG. 14

METHOD, DEVICE AND BASE STATION FOR TRANSMITTING INFORMATION

CROSS-REFERENCE TO RELATED APPLICATION

This application is the U.S. national phase application of International Application No. PCT/CN2018/108862, filed Sep. 29, 2018, the entire contents of which are incorporated herein by reference for all purposes.

TECHNICAL FIELD

The present disclosure relates to a method, device and base station for transmitting information.

BACKGROUND

With the gradual evolution of mobile communication networks to 5G New Radio (NR) systems, mobile communication systems have opened up many new frequency resources for information transmission. The adoption of high-frequency spectrum is a feature of new mobile communication systems such as 5G NR. Another feature of new spectrum band opened up by the new mobile communication system is the extensive use of unlicensed spectrum such as 2.4 GHz, 5 GHz and the like for transmission.

When base stations and terminals are operated in an unlicensed spectrum, they are required to work with other systems such as WiFi. Therefore, they are also required to follow the channel avoidance scheme of the WiFi system, that is, an LBT (listen before talk) scheme. In a case of transmitting in the unlicensed spectrum, the terminal occupies a channel for a period of time according to a Maximum Channel Occupancy Time (MCOT) or a Channel Occupancy Time (COT) under the grant of the base station, after succeeding in detect a transmission opportunity under the LBT scheme.

Regarding the utilization of unlicensed spectrum resources, the mobile communication system also introduces a grant-free uplink (GUL, also referred to as Autonomous uplink (AUL)) transmission scheme. Under this grant-free uplink transmission scheme, the base station is not required to schedule uplink resources for each uplink transmission of the terminal; instead, it schedules grant-free uplink transmission resources for the terminal, that is, configure a transmission period for available resources of the unlicensed spectrum, so that the terminal can perform uplink transmission automatically through an uplink transmission resource corresponding to the transmission period.

However, there are limited transmission resources in a wireless communication system. If many UEs are scheduled for grant-free uplink transmission, a large amount of uplink resources are to be reserved in the system. However, the UEs scheduled for grant-free uplink transmission does not have uplink services to be transmitted all the time. Thus, waste of resources cannot be avoided.

SUMMARY

According to a first aspect of the present disclosure, there is provided a method of transmitting information, applicable to a base station, and including:

determining a participating terminal group, each participating terminal UE of the participating terminal group sharing periodic uplink transmission resources in a same grant-free uplink transmission period of an unlicensed spectrum;

determining shared grant-free uplink transmission configuration information for the participating terminal group, wherein the shared grant-free uplink transmission configuration information is configured to instruct each participating terminal of the participating terminal group to perform uplink transmission automatically according to a preset periodic uplink transmission resource in an unlicensed spectrum.

In an embodiment of the present disclosure, determining the participating terminal group includes:

determining a preset transmission reference information of each terminal in a case of transmitting information in the unlicensed spectrum through beam forming technology, wherein the preset transmission reference information comprises at least one of uplink data information to be transmitted and position information of the terminal with respect to the base station; and determining an initial participating terminal group according to at least two terminals in response to that the preset transmission reference information of the at least two terminals satisfies a preset grouping condition.

According to a second aspect of the present disclosure, a method of transmitting information is provided, applicable to a base station and including:

determining a participating terminal group, each participating UE of the participating terminal group sharing a periodic uplink transmission resource in a same grant-free uplink transmission period in an unlicensed spectrum; and determining shared grant-free uplink transmission configuration information for the participating terminal group, wherein the shared grant-free uplink transmission configuration information is configured to instruct each participating terminal of the participating terminal group to perform uplink transmission automatically in according to a preset periodic uplink transmission resource in the unlicensed spectrum.

According to a third aspect of the present disclosure, a device for transmitting information is provided, applicable to a base station, and including:

a grouping module, configured to determine a participating terminal group, each participating terminal UE of the participating terminal group sharing a periodic uplink transmission resource in a same grant-free uplink transmission period in an unlicensed spectrum; and a configuration information determining module, configured to determine shared grant-free uplink transmission configuration information for the participating terminal group, wherein the shared grant-free uplink transmission configuration information is configured to instruct each participating terminal of the participating terminal group to perform uplink transmission automatically according to a preset periodic uplink transmission resource in the unlicensed spectrum.

According to a fourth aspect of embodiments of the present disclosure, a device for transmitting information is provided, applicable to a base station, and comprising:

a grouping module, configured to determine a participating terminal group, each participating terminal UE of the participating terminal group sharing a periodic uplink transmission resource in a same grant-free uplink transmission period in an unlicensed spectrum; and a first configuration information determining module, configured to determine shared grant-free uplink transmission configuration information for the participating terminal group, wherein the shared grant-free uplink transmission configuration information is configured to instruct each participating terminal of the participating terminal group to perform uplink transmission automatically according to a preset period uplink transmission resource in the unlicensed spectrum.

According to a fifth aspect of embodiments of the present disclosure, a non-transitory computer-readable storage medium is provided, having computer instructions stored thereon, wherein, in response to the instructions are executed by a processor, operations of any one of the methods according to the first aspect are implemented.

According to a sixth aspect of embodiments of the present disclosure, a non-transitory computer-readable storage medium is provided, having computer instructions stored thereon, wherein, in response to the instructions are executed by a processor, operations of any one of the methods according to the second aspect are implemented.

According to a seventh aspect of embodiments of the present disclosure, a base station is provided, including:
 a processor;
 memory, configured to store instructions executable by the processor;
 wherein, the processor is configured to:
  determine a participating terminal group, each participating terminal UE of the participating terminal group sharing a periodic uplink transmission resource in a same grant-free uplink transmission period in an unlicensed spectrum; and
  determine shared grant-free uplink transmission configuration information for the participating terminal group, wherein the shared grant-free uplink transmission configuration information is configured to instruct each participating terminal of the participating terminal group to perform uplink transmission automatically according to a preset periodic uplink transmission resource in the unlicensed spectrum.

In the present disclosure, the base station may group two or more associated terminals into a participating terminal group, thereby configuring a same grant-free uplink transmission period for each participating terminal of the participating terminal group, so that the participating terminals perform uplink transmission automatically through a same periodic uplink transmission resource, thereby improving the utilization of uplink transmission resources in an unlicensed grant-free spectrum and reducing scheduling signaling overhead.

It should be understood that the above general description and the following detailed description are only exemplary and explanatory, and cannot be construed as a limit to the present disclosure.

BRIEF DESCRIPTION OF THE DRAWINGS

The drawings here are incorporated into the specification and constitute a part of the specification, illustrate embodiments consistent with the present disclosure, and are used together with the specification to explain the principle of the present disclosure.

FIG. 13A is a schematic diagram illustrating an application scenario of transmitting information according to an exemplary embodiment of the present disclosure.

FIG. 13B is a schematic diagram illustrating an application scenario of transmitting information according to another exemplary embodiment of the present disclosure.

FIG. 14 is a flowchart illustrating a method of transmitting information according to another exemplary embodiment of the present disclosure.

DETAILED DESCRIPTION OF THE EMBODIMENTS

Figure 1:
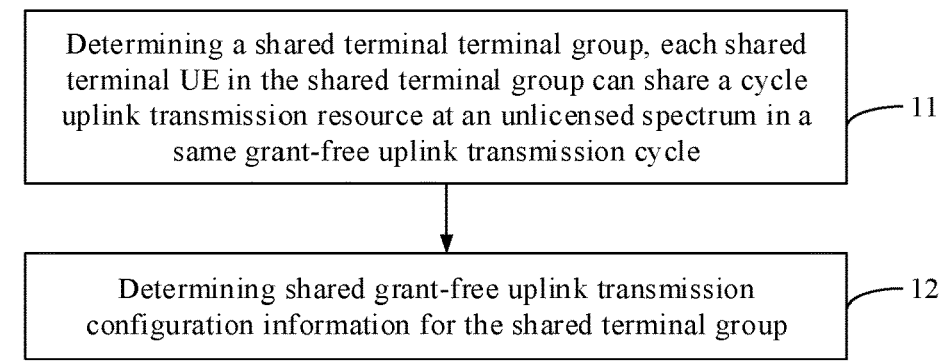
FIG. 1 illustrates a flow chart of a method of transmitting information according to an exemplary embodiment of the present disclosure.

Exemplary embodiments will be described in detail here, and examples thereof are illustrated in the accompanying figures. When the following description refers to the figures, unless otherwise indicated, the same reference numeral in different drawings indicates the same or similar element. The implementation manners described in the following exemplary embodiments do not represent all implementation manners consistent with the present disclosure. On the contrary, they are merely examples of devices and methods consistent with some aspects of the present disclosure as defined in the appended claims.

The terms used in the present disclosure are only for the purpose of describing specific embodiments, and are not intended to limit the present disclosure. The singular forms of "a", "said" and "the" used in the present disclosure and the appended claims are also intended to include plural forms, unless the context clearly indicates other meanings. It should also be understood that the term "and/or" as used herein refers to and includes any or all possible combinations of one or more associated listed items.

It should be understood that although the terms "first", "second", "third", etc. may be used in this disclosure to describe various information, the information should not be limited to these terms. These terms are only used to distinguish information of the same type from each other. For example, without departing from the scope of the present disclosure, the first information may also be referred to as second information, and similarly, the second information may also be referred to as first information. Depending on the context, the word "if" as used herein can be interpreted as "when" or "at the time that" or "in response to determining."

The executive bodies involved in this disclosure include: a base station and user equipment (UE) in mobile communication networks such as 4G LTE (Long Term Evolution), LTE-NR interworking, 5G NR, etc., the base station may be a base station, a sub-base station, etc., provided with a large-scale antenna array. The user equipment may be a user terminal, a user node, a mobile terminal or a tablet computer, etc. In the specific implementation process, the base station and the user equipment are independent of each other, and at the same time, they are connected to each other to jointly implement the technical solutions according to the present disclosure.

An application scenario of the present disclosure is that the terminal performs uplink data transmission through beam forming technology with the high-frequency resources of the unlicensed spectrum. As the unlicensed spectrum allows various technologies such as Bluetooth, WiFi and other technologies to be used, the interference environment is usually complicated. In order to prevent the terminal from abusing grant-free spectrum resources, controlled use is generally advocated, that is, the base station controls the terminal to use unlicensed spectrum resources.

Based on this, the present disclosure provides a method of transmitting information. Referring to FIG. 1, which illustrates a flowchart of a method of transmitting information according to an exemplary embodiment, the method may be applicable to a base station, and the method may include:

In step 11, a participating terminal group is determined, and respective participating UEs of the participating terminal group share a periodic uplink transmission resource of a grant-free uplink transmission period in an unlicensed spectrum;

In this disclosure, the base station may group two or more than two terminals that are correlated as a participating terminal group according to actual requirements, for example, there are more terminals are required to transmit uplink service data through a resource of an unlicensed spectrum and there are relatively less currently available unlicensed spectrum resources, the base station can group two or more associated terminals into a participating terminal group, so as to configure same grant-free uplink transmission period for respective participating terminals of the group, such that the respective participating terminals performs uplink transmission automatically through same period uplink transmission resources, thereby improving utilization of the uplink transmission resources in the unlicensed spectrum and reducing scheduling signaling overhead.

Regarding the base station determining the participating terminal group, it may include: determining an initial participating terminal group, and performing grouping adjustment based on a situation of uplink transmission of the original participating terminal group. Wherein, the original participating terminal group includes but is not limited to the initial participating terminal group.

Figure 2:
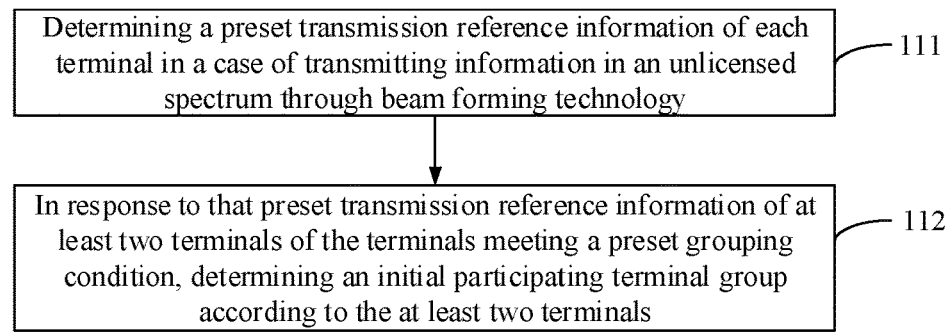
FIG. 2 illustrates a flowchart of a method of transmitting information according to another exemplary embodiment of the present disclosure.
Figure 3:
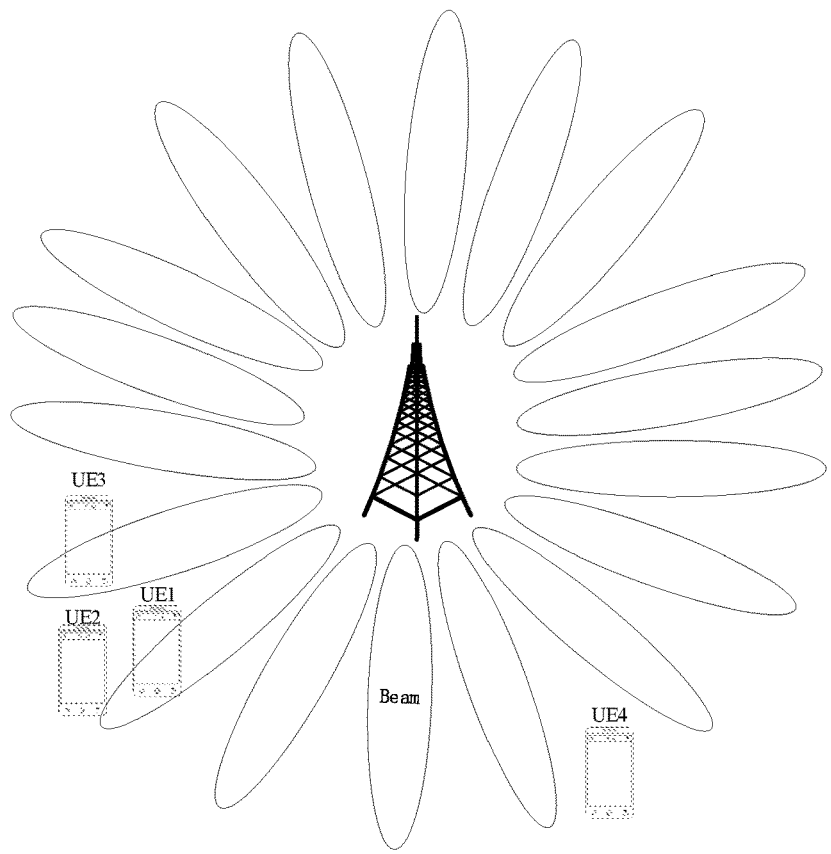
FIG. 3 is a schematic diagram illustrating an application scenario for transmitting information according to an exemplary embodiment of the present disclosure.

Correspondingly, implementation of step 11 may include at least two cases:

In the first case, the base station first groups the terminals, that is, the base station determines an initial participating terminal group. Referring to FIG. 2, which illustrates a flowchart of a method of transmitting information according to another exemplary embodiment, the step 11 may include:

in step 111, a preset transmission reference information of each terminal in a case of transmitting information in an unlicensed spectrum through beam forming technology is determined, wherein the preset transmission reference information includes: uplink data information to be transmitted, and/or, position information of the terminal with respect to the terminal is relatively Location information at the base station;

Regarding the beam forming technology, its communication process is substantially as follows: a transmitting end, such as a base station, directionally transmits high-frequency beams with a frequency above 6 GHz by aiming a large-scale antenna array to a position where the receiving end such as the user equipment UE is located; after receiving the beams, the receiving end establishes a communication with the transmitting end so as to transmit/receive information through the high-frequency beam. Please refer to FIG. 3, which is a schematic diagram illustrating an application scenario of transmitting information according to an exemplary embodiment.

In the present disclosure, the base station may determine uplink data information to be transmitted by the UE according to related arts, such as an uplink Buffer Status Report (BSR) transmitted by the UE. The uplink data information to be transmitted may include: amount of uplink data, service type and the like.

In the present disclosure, the position information of the terminal with respect to the base station includes: direction information of the terminal with respect to the base station, and distance information of the terminal with respect to the base station.

The base station may determine direction information of a terminal with respect to the base station according to beam information used by the base station in a case of communicating with the terminal. The beam information may be determined according to antenna array information used by the base station in a case of communicating with the UE, or may be determined according to antenna module information reported by the UE. Since the base station can enable different antenna arrays to transmit signals for UEs in different directions; similarly, the UE can enable antenna modules in different locations to receive signals in different directions. Therefore, the base station may determine the direction information of the terminal according to the beam information.

In the present disclosure, the base station may determine a distance between the terminal and the base station according to preset distance reference information, wherein the preset distance reference information may include at least one of followings: a Reference Signal Received Power (RSRP) of downlink reference signal, Reference Signal Received Quality (RSRQ) of downlink reference signal, uplink power control information, Modulation and Coding Scheme (MCS), Timer Advance (TA).

The closer the UE is to the base station, the larger the determined RSRP/RSRQ value, and correspondingly, the smaller the uplink transmitting power of the UE. Therefore, the base station may calculate the distance to the terminal, according to a preset strategy, based the RSRP/RSRQ and the uplink power control information reported by the UE.

Similarly, the closer the distance between the base station and the UE, the higher the determined MCS level. The base station may calculate the distance between the base station and the UE based on the MCS level determined for the UE according to a preset strategy.

Regarding TA, the farther the UE is from the base station, the greater the time advance required for the UE to transmit uplink. The base station may calculate the distance between the UE and the base station according to a preset algorithm and according to the foregoing rules.

In step 112, in response to that preset transmission reference information of at least two terminals of the terminals meets a preset grouping condition, an initial participating terminal group is determined according to the at least two terminals.

In the present disclosure, the base station may group the terminals according to the uplink data information to be transmitted of respective terminals and/or relative position information between the terminals. The following exemplifies different manners for the base station to determine participating terminal group according to different grouping standard:

In the first manner, the base station determines an initial participating terminal group according to information of uplink data to be transmitted by the UE; which may include two cases:

In case I, the base station may group UEs with similar data information to be transmitted into a group. For example, the base station groups terminals with similar amount of uplink data to be transmitted into a group or group terminals with same service type of uplink data to be transmitted as a group, or group terminals with similar requirements on delay sensitivity into a group.

Case II: The base station determines an initial participating terminal group according to the grant-free uplink transmission periods configured for respective UEs.

Figure 4:
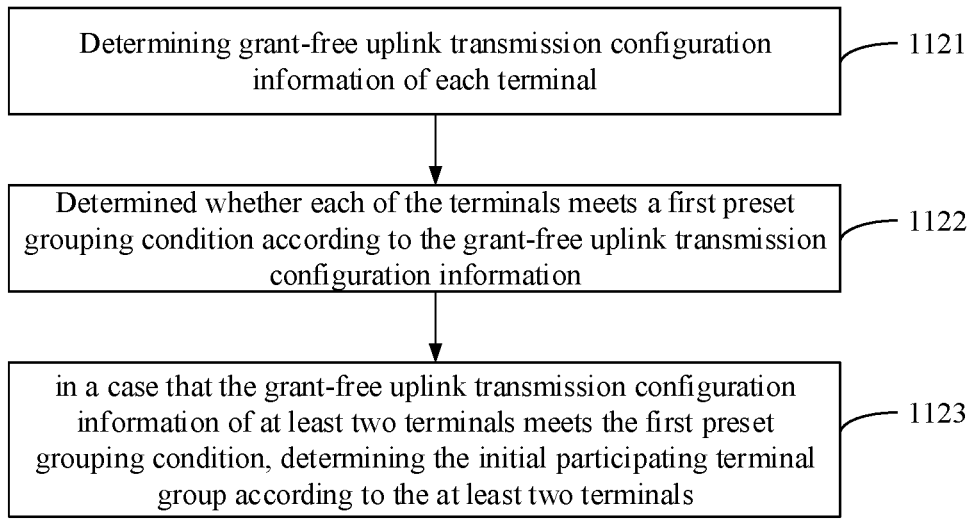
FIG. 4 illustrates a flow chart of a method of transmitting information according to another exemplary embodiment of the present disclosure.

Referring to FIG. 4, which is a flowchart illustrating a method of transmitting information according to another exemplary embodiment, the step 112 may include:

In step 1121, grant-free uplink transmission configuration information of each terminal is determined. The grant-free uplink transmission configuration information includes: a time-frequency range of the grant-free uplink transmission period, and a time-frequency range of periodic uplink transmission resources in the grant-free uplink transmission period.

In the present disclosure, in a case that the base station has configured grant-free uplink transmission configuration information for a UE, such as UE1, before grouping, it directly determines the grant-free uplink transmission configuration information of the UE1.

In a case that the base station does not perform grant-free uplink transmission configuration for a current UE before grouping, it may determine grant-free uplink transmission configuration information for the UE to use according to the uplink to-be-transmitted information.

Figure 5:
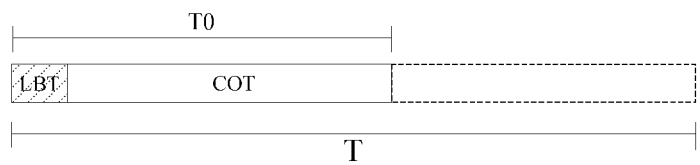
FIG. 5 is a schematic diagram illustrating a scene of transmitting information according to another exemplary embodiment of the present disclosure.

The grant-free uplink transmission configuration information includes at least: a time-frequency range of the grant-free uplink transmission period, and a time-frequency range of the periodic uplink transmission resources in the transmission period, that is, a time-frequency range of a COT window. Among them, a structure of a grant-free uplink transmission period may be as illustrated in FIG. 5. A grant-free transmission period T includes: periodic uplink transmission resources T0 available to the UE and resources to be allocated (resources indicated by the dashed line); wherein, the periodic uplink transmission resource T0 configured for the UE includes: an LBT detection window and a transmission window, and the transmission window may also be referred to as a COT window.

The UE performs LBT detection in the LBT (listen before talk, channel avoidance) detection window, and transmits information after the LBT detection succeeds. Regarding LBT detection, in a wireless communication system, when an information transmitter, such as UE, is required to transmit information through transmission resources in an unlicensed spectrum, it first performs idle channel detection in the unlicensed spectrum. After a transmission opportunity is successfully detected, the information transmitter occupies a channel for a period for information transmission according to a Maximum Channel Occupancy Time (MCOT) or a Channel Occupancy Time (COT) defined by the system.

In step 1122, it is determined whether each of the terminals meets a first preset grouping condition according to the grant-free uplink transmission configuration information, and the first preset grouping condition includes: time domain ranges of the grant-free uplink transmission periods of at least two terminals are the same or have a multiple relationship, and have a synchronization starting time;

In step 1123, in a case that the grant-free uplink transmission configuration information of at least two terminals meets the first preset grouping condition, the initial participating terminal group is determined according to the at least two terminals.

Figure 6:
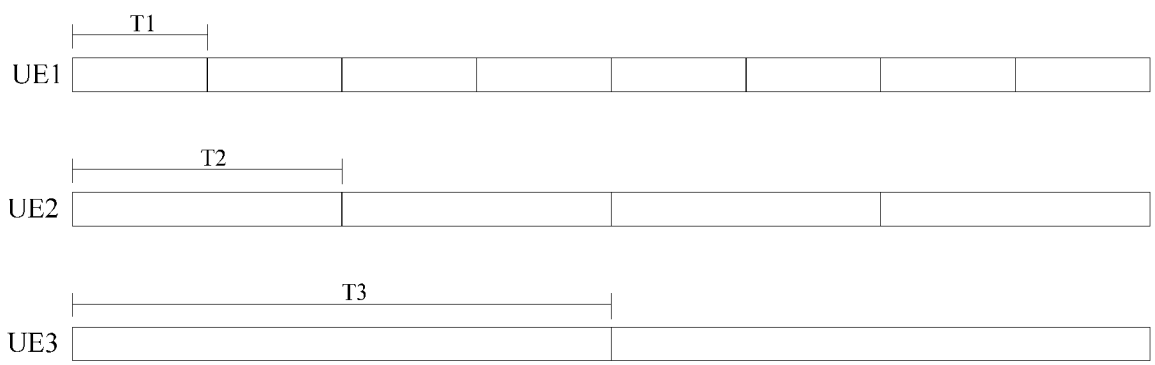
FIG. 6 is a schematic diagram illustrating an application scenario of transmitting information according to another exemplary embodiment of the present disclosure.

The following is a description with a specific example. It is assumed that there are three UEs, respectively represented as: UE1, UE2, and UE3. The grant-free uplink transmission periods of the three UEs are illustrated in FIG. 6. The grant-free uplink transmission period configured by the base station for UE1 is T1, assuming it is 2 ms, that is, T1=2 ms; the grant-free uplink transmission period configured by the base station for UE2 is T2, assuming it is 4 ms, that is, T2=4 ms; the grant-free uplink transmission period configured by the base station for UE3 is T3, assuming it is 8 ms, that is, T3=8 ms.

As the grant-free uplink transmission periods of the three UEs have a multiple relationship, and the three transmission periods have a synchronization starting time, the base station may group the three UEs into a group and configure a same grant-free uplink transmission period, such that the three UEs share the periodic uplink transmission resources in the transmission period.

In the second manner, the base station determines an initial participating terminal group according to location information of each UE with respect to the base station.

Figure 7:
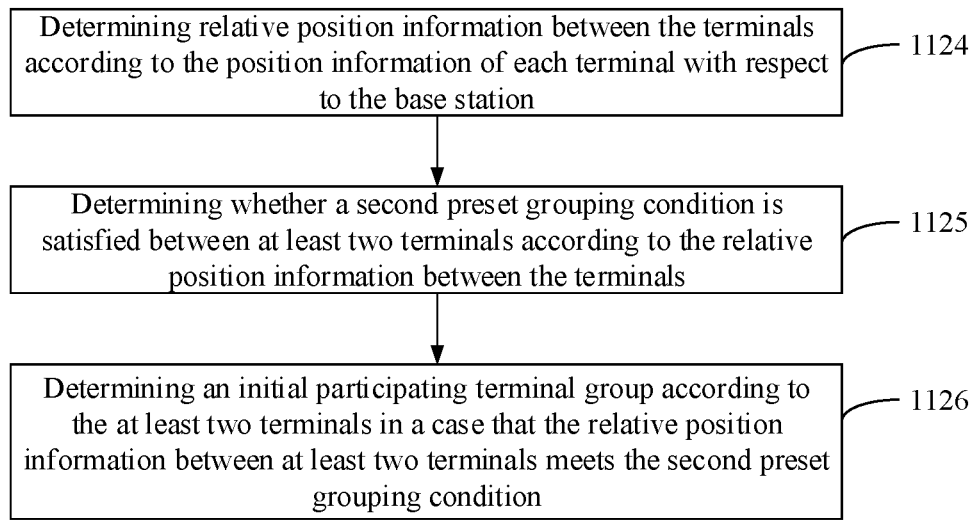
FIG. 7 is a flowchart illustrating a method of transmitting information according to another exemplary embodiment of the present disclosure.

Referring to FIG. 7, which is a flowchart illustrating a method of transmitting information according to another exemplary embodiment, the step 112 may include:

In step 1124, relative position information between the terminals is determined according to the position information of each terminal with respect to the base station;

In step 1125, it is determined whether a second preset grouping condition is satisfied between at least two terminals according to the relative position information between the terminals, wherein the second preset grouping condition includes: the direction deviation between the terminals is not greater than a preset angle threshold, and a distance between the terminals is not greater than a preset distance threshold;

In step 1126, in a case that the relative position information between at least two terminals meets the second preset grouping condition, an initial participating terminal group is determined according to the at least two terminals.

In the embodiments of the present disclosure, the base station may further determine relative position information between every two terminals according to the position information of each terminal with respect to the base station. It is default that a plurality of terminals have mutual checkability in a case that the plurality of terminals are close to each other, that is, any terminal can detect whether any other terminal is transmitting information through transmission resource in the unlicensed spectrum. Thus, the plurality of terminals can be grouped as an initial participating terminal group, such that each participating terminal of the initial participating terminal may be configured with a same grant-free uplink transmission period.

In the third manner, the base station determines an initial participating terminal group according to uplink data information of each UE to be transmitted and the position information of the UE with respect to the base station.

Figure 8:
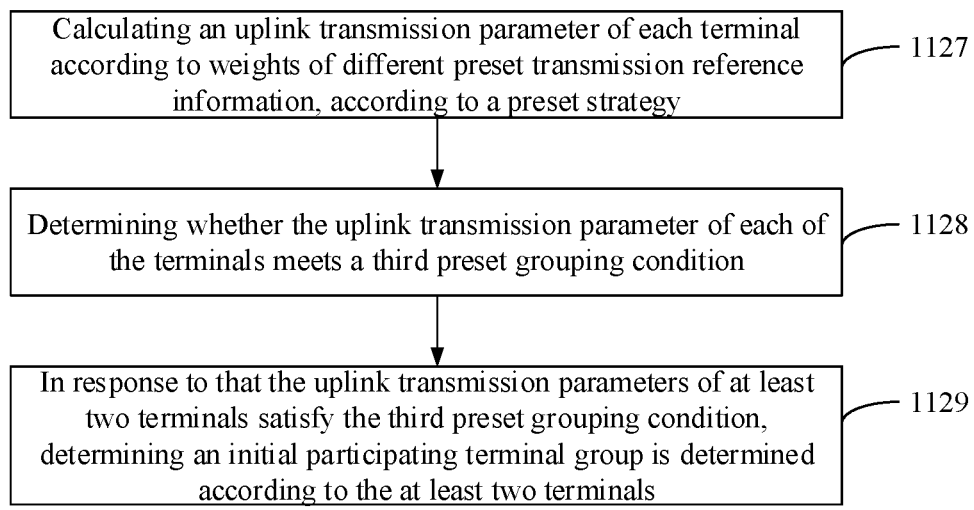
FIG. 8 is a flowchart illustrating a method of transmitting information according to another exemplary embodiment of the present disclosure.

Referring to FIG. 8, which is a flowchart illustrating a method of transmitting information according to another exemplary embodiment, the foregoing step 112 may include:

In step 1127, an uplink transmission parameter of each terminal is calculated, according to weights of different preset transmission reference information, according to a preset strategy;

In step 1128, it is determined whether the uplink transmission parameter of each of the terminals meets a third preset grouping condition, wherein the third preset grouping condition includes: an uplink transmission parameter difference between the terminals less than a preset threshold;

In step 1129, in response to that the uplink transmission parameters of at least two terminals satisfy the third preset grouping condition, an initial participating terminal group is determined according to the at least two terminals.

In the embodiments of the present disclosure, alternatively, the base station may calculate a preset uplink transmission parameter by comprehensively considering the terminal information based on the uplink data information to be transmitted, the position information of the terminal with respect to the base station, and the respective preset weights, according to a preset strategy. Then the terminals with relatively close uplink transmission parameters is preliminarily determined as participating terminals that may share periodic uplink transmission resources, that is, it is determined whether the difference of the preset uplink transmission parameters between every two terminals is less than a preset threshold, in response to that the difference is less than the preset threshold, it is determined that the current two terminals may share uplink transmission resources. Similarly, a plurality of terminals with similar uplink transmission parameter are grouped into a group.

In the second case, a corresponding base station performs grouping adjustment based on situation of uplink transmission of an original participating terminal group.

Original participating terminal group may not perform uplink transmission automatically through the same grant-free uplink transmission period due to changes in the relative positions between the terminals, obstacles blocking the transmission of signals in the unlicensed spectrum, wrongly grouping the participating terminals, or the like.

Figure 9:
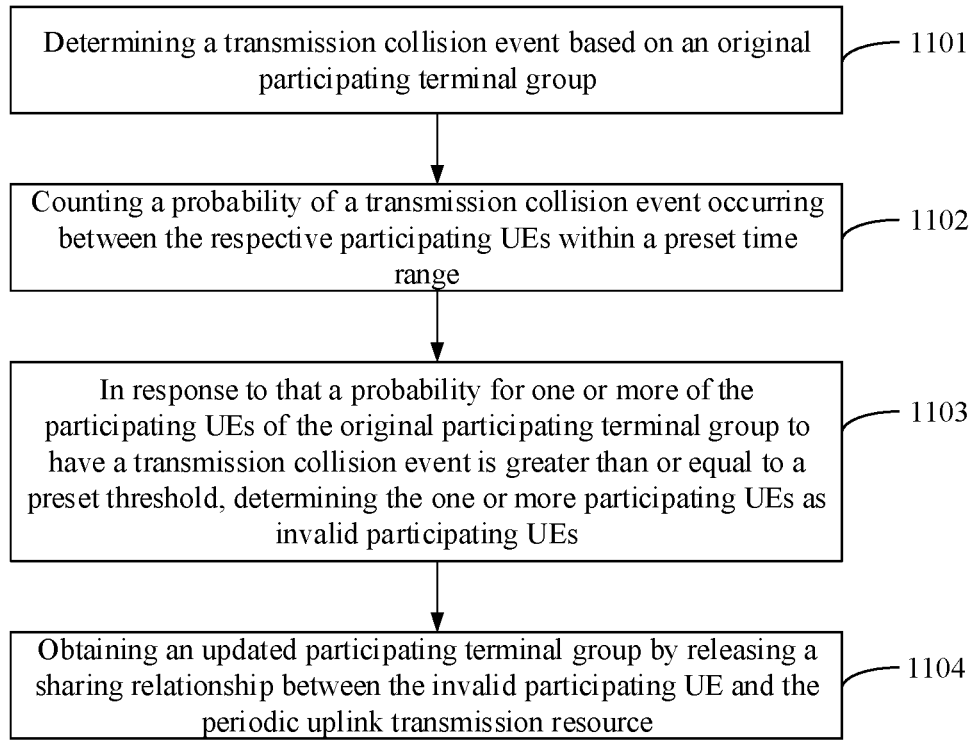
FIG. 9 illustrates a flowchart of a method of transmitting information according to another exemplary embodiment of the present disclosure.

Referring to FIG. 9, which is a flowchart illustrating a method of transmitting information according to another exemplary embodiment, the step 11 may include followings:

In step 1101, a transmission collision event is determined based on an original participating terminal group, wherein the transmission collision event indicates an event that at least two participating terminals of the original participating terminal group have succeeded in LBT detection at the same time, and fail in uplink transmission through a same uplink transmission resource at the same time.

As described above, in the present disclosure, the original participating terminal group may be the initial participating terminal group, or may be a group adjusted by the base station on the basis of the initial participating terminal group, which is not limited in the present disclosure. Description is set forth by taking the initial sharing terminal group as an example.

As in the above example, assuming that the initial terminal group determined by the base station includes UE1, UE2, and UE3, the base station may count transmission collision events in a case that respective participating UEs utilize the same period uplink transmission resource. The so-called transmission collision event means that two or more than two participating succeed in performing an LBT detection on the same uplink transmission resource and fail in performing uplink transmission on the uplink transmission resource.

As the initial participating terminal group may not be appropriate, for example, two participating UEs have close uplink transmission information and they are far apart and cannot detect each other's transmission information; or the two participating UEs are very close to each other and there is an obstacle therebetween, making it impossible to detect each other's information transmission on the unlicensed spectrum resources, resulting in a transmission collision event.

In an embodiment of the present disclosure, the base station may determine a transmission collision event based on uplink transmission analysis information for each participating UE. Wherein, the uplink transmission analysis information for each participating UE by the base station may include: Hybrid Automatic Repeat reQuest (HARQ) feedback information transmitted by the base station to the participating UE, for example, NACK information that, configured to indicate uplink transmission failure and is to transmit to the participating UE.

Suppose that the base station receives uplink transmission data transmitted by UE1 and UE2 respectively within a same time range, and fails in obtaining the uplink transmission data by analyzing the uplink transmission data, the base station is to transmit the NACK information to both UE1 and UE2. As the base station knows that the same grant-free periodic uplink transmission resource for UE1 and UE2, the base station may determine that there is a transmission collision event between UE1 and UE2. Wherein, the same time range may be a time domain range of a periodic uplink transmission resource plus a preset time delay, or one grant-free uplink transmission period.

In another embodiment of the present disclosure, alternatively, the base station may determine the transmission collision event according to uplink transmission failure information reported by each participating UE.

Figure 10:
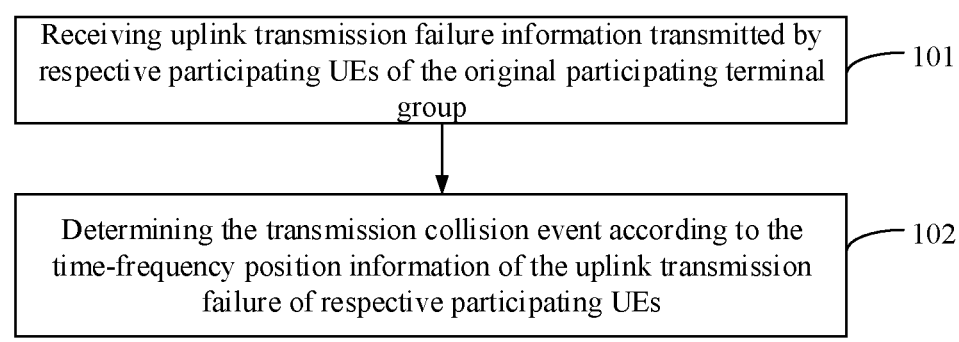
FIG. 10 illustrates a flow chart of a method of transmitting information according to another exemplary embodiment of the present disclosure.

Referring to FIG. 10, which is a flowchart illustrating a method of transmitting information shown in FIG. 10 according to another exemplary embodiment, the step 1101 may include the followings:

In step 101, receiving uplink transmission failure information transmitted by respective participating UEs of the original participating terminal group, wherein the uplink transmission failure information includes: LBT detection success information and time-frequency position information of failed uplink transmission;

In the embodiments of the present disclosure, in a case that a participating UE fails to receive HARQ feedback information transmitted by the base station within a preset time period after completing an uplink transmission, it may be determined that a current uplink transmission has failed according to the system agreement, and the current uplink transmission is a failed uplink transmission. At this time, the participating UE may report to the base station both LBT detection success information and a time-frequency position information of the current failed uplink transmission.

In step 102, the transmission collision event is determined according to the time-frequency position information of the uplink transmission failure of respective participating UEs.

After obtaining the uplink transmission failure information reported by respective UEs, the base station determines which participating UEs have a transmission collision event based on identity information of the UEs to which the uplink transmission failure event occurs at the same time-frequency position.

In step 1102, a probability of a transmission collision event occurring between the respective participating UEs within a preset time range is counted;

In view of the fact that the cause of the collision transmission event is not limited to that the participating UEs are not appropriate to share periodic uplink transmission resource, that is, the transmission collision event between participating UEs may be accidental. Therefore, the base station can count a probability of occurrence of a transmission collision event between the participating UEs within a period of time, and then determine based on the probability of occurrence of a transmission collision event whether a transmission collision event frequently occurs between participating UEs due to lack of mutual detection.

In step 1103, in response to that a probability for one or more of the participating UEs of the original participating terminal group to have a transmission collision event is greater than or equal to a preset threshold, the one or more participating UEs are determined as invalid participating UEs;

In the present disclosure, the invalid participating UE refers to a participating UE of the original participating UE group that frequently encounters transmission collisions with other participating UEs.

In step 1104, a sharing relationship between the invalid participating UE and the periodic uplink transmission resource is released, and an updated participating terminal group is obtained.

In the present disclosure, in a case that one or more participating UEs of the original participating terminal group often have a transmission collision event with other participating UEs, for example within a preset time period such as 10 shared grant-free uplink transmission periods, a probability that UE1 has a transmission collision event exceeds a preset threshold, such as by 85%, it may be determined that UE1 is not appreciate to share the same periodic uplink transmission resources with other participating UEs, and a sharing relationship of the foregoing UE1 with the periodic uplink transmission resources may be released. In the above example, the invalid participating UE being UE1 is taken as an example for description. In the present disclosure, there may be one or more invalid participating UEs of the original participating terminal group that do not meet the sharing condition.

In the embodiments of the present disclosure, the base station may further determine the invalid participating UE based on the original participating terminal group, and release the sharing relationship between the invalid participating UE and other participating UEs, thus the accuracy that the base station determines the participating terminal group is improved, thereby improving the utilization of the participating terminal group on shared uplink resources, reducing resource waste and improving the reliability that UEs transmits information through an unlicensed spectrum.

Figure 11:
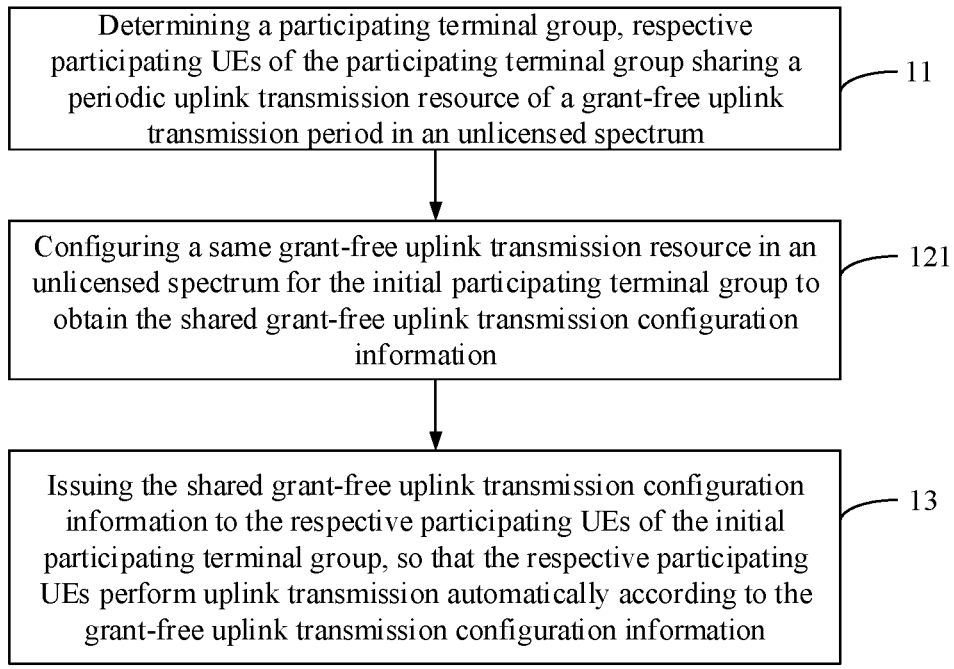
FIG. 11 illustrates a flowchart of a method of transmitting information according to another exemplary embodiment of the present disclosure.

In step 12, shared grant-free uplink transmission configuration information is determined for the participating terminal group;

For the first case described above, that is, the case that the base station determines the initial participating terminal group, please refer to FIG. 11, which is a flowchart illustrating a method of transmitting information according to another exemplary embodiment, the above step 12 may comprise:

In step 121, a same grant-free uplink transmission resource in an unlicensed spectrum is configured for the initial participating terminal group to obtain the shared grant-free uplink transmission configuration information.

Regarding how to configure the shared grant-free uplink transmission period for the initial participating terminal group, original grant-free uplink transmission configuration information of one of the participating terminals may be determined as shared grant-free uplink transmission configuration information of the initial participating terminal group; or, a new periodic grant-free spectrum resource may be configured for the initial participating terminal group, thereby determining the shared grant-free transmission configuration information.

Corresponding to the second case of the first manner, that is, corresponding to the case that the base station determines the initial participating terminal group according to the grant-free uplink transmission period configured for respective terminals, the base station may configure, according to original grant-free uplink transmission configuration information of the respective participating terminals, a same grant-free uplink transmission resource (that is, shared grant-free uplink transmission resource) in the unlicensed spectrum for the initial participating terminal group.

Figure 12:
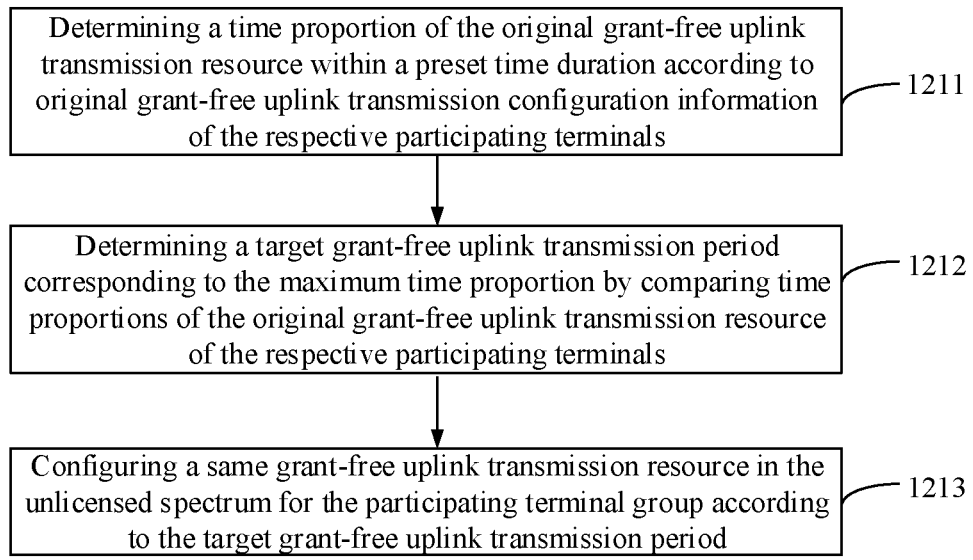
FIG. 12 is a flowchart illustrating a method of transmitting information according to another exemplary embodiment of the present disclosure.

Referring to FIG. 12, which is a flowchart of a method of transmitting information according to another exemplary embodiment of the present disclosure, the above configuration of the same unlicensed spectrum grant-free uplink transmission resources for the initial participating terminal group may include followings:

In step 1211, a time proportion of the original grant-free uplink transmission resource within a preset time duration is determined according to original grant-free uplink transmission configuration information of the respective participating terminals, wherein the preset period is not less than a maximum original grant-free uplink transmission period;

and wherein, the original grant-free uplink transmission configuration information of a participating UE indicates grant-free uplink transmission configuration information configured by the base station for the participating UE before the participating UE is grouped. The proportion of the original grant-free uplink transmission resource within the preset duration indicates a ratio of a sum of time lengths of periodic grant-free uplink transmission resource configured by the base station for the participating UEs within a preset time duration to the preset time duration.

In step 1212, a target grant-free uplink transmission period corresponding to the maximum time proportion is determined by comparing time proportions of the original grant-free uplink transmission resource of the respective participating terminals; and In step 1213, a same grant-free uplink transmission resource in the unlicensed spectrum is configured for the participating terminal group according to the target grant-free uplink transmission period.

Description will be given with specific examples hereinafter. As illustrated in FIG. 5, regarding the configuration of COT window duration, related arts may include two configuration manners:

In the first configuration manner, a time duration of the COT window in a grant-free uplink transmission period is a fixed period defined by the system. In this manner, a UE configured with a grant-free uplink transmission period may be referred to as a first type of equipment, also known as Frame Based Equipment (FBE).

In the second configuration manner, a time duration of the COT window is scheduled according to a load of the UE, and may be dynamically changed. In this manner, a UE configured with a grant-free uplink transmission period may be referred to as a second type of equipment, also known as Load Based Equipment (LBE).

Refer to FIG. 13A, which illustrates a schematic diagram of an application scenario of transmitting information according to an exemplary embodiment. In this scenario, assuming that the initial participating terminal group includes three participating UEs, namely UE1, UE2, and UE3, and each participating UE is configured with periodic uplink transmission resource in the first configuration manner before being grouped, that is, the UEs belong to the first type of equipment.

In the embodiments of the present disclosure, since the duration of the uplink transmission resources configured by the base station for any grant-free uplink transmission period is the same, the time proportion of the uplink transmission resources of the UE1 accounts for the largest proportion, that is, within the same duration, such as within 16 ms, UE1 has the most grant-free uplink transmission resources configured by the base station. Therefore, the base station can determine the shared grant-free uplink transmission resources of the initial participating terminal group by referring to the grant-free uplink transmission configuration information of the UE1.

The base station may directly determine the grant-free uplink transmission configuration information of the UE1 as the shared grant-free uplink transmission configuration information of the initial participating terminal group, that is, with the same period and with the same time-frequency range; in this case, the base station is not required to issue shared grant-free uplink transmission configuration information, thereby saving signaling overhead.

Alternatively, the base station may determine shared grant-free uplink transmission configuration information for the initial participating terminal group in a new spectrum according to the grant-free uplink transmission period of the UE1, that is, with a same period and with different frequency range. In such a case, the base station is not required to determine the shared grant-free uplink transmission period, which may reduce the amount of calculation.

Refer to FIG. 13B, which illustrates a schematic diagram of an application scenario of transmitting information according to another exemplary embodiment. In this scenario, the difference of this scenario from the scenario as illustrated in FIG. 13A is that the three participating terminals UE1, UE2, and UE3 belong to the second type of equipment, that is, LBE equipment.

It can be seen from FIG. 13B that the original grant-free uplink transmission resource of the UE3 has a largest time proportion within a preset duration such as T3. Therefore, the base station may determine shared grant-free uplink transmission configuration information for the initial participating terminal group according to the original grant-free uplink transmission configuration information of the UE3, detailed process may be referred to the description of corresponding steps in the embodiment as illustrated in FIG. 13A, and will not be elaborated herein.

In step 13, the shared grant-free uplink transmission configuration information is issued to the respective participating UEs of the initial participating terminal group, so that the respective participating UEs perform uplink transmission automatically according to the grant-free uplink transmission configuration information.

In view of the second case described above, i.e., the base station performs adjustment according to the original participating terminal group to obtain an updated participating terminal group.

Referring to FIG. 14, which is a flowchart illustrating a method of transmitting information according to another exemplary embodiment, the step 12 may include:

In step 122, shared grant-free uplink transmission configuration information of the original participating terminal group is determined as shared grant-free uplink transmission configuration information of the updated participating terminal group.

In the present disclosure, after adjusting the participating terminal group, the base station may keep the shared grant-free uplink transmission configuration information unchanged. At this time, there is no need to re-inform each participating terminal of the updated participating terminal group so as to save signaling overhead.

Figure 15:
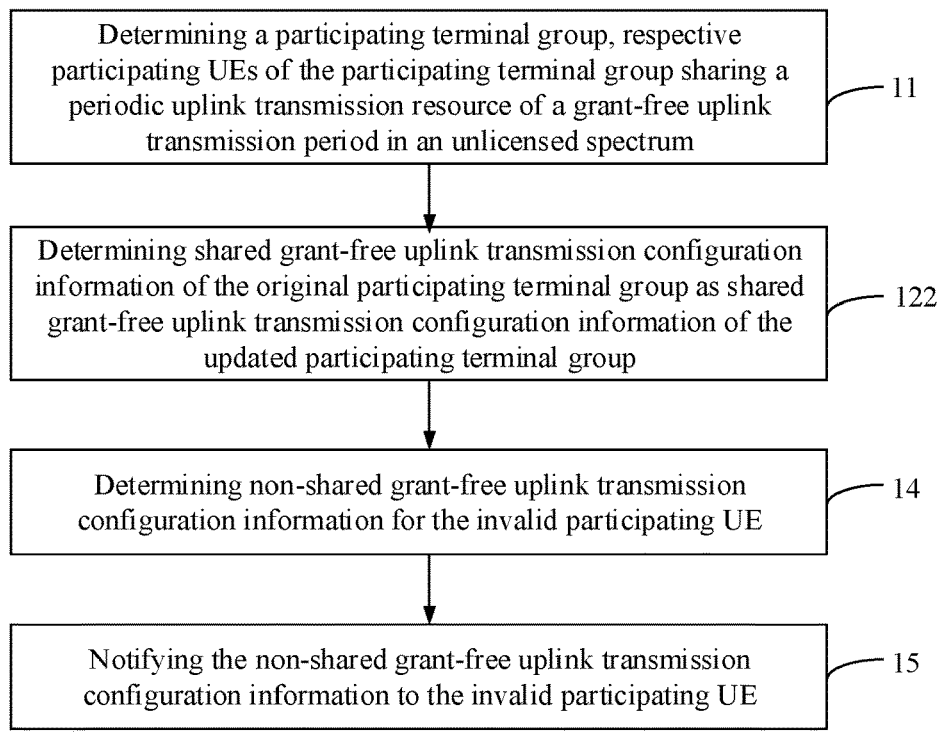
FIG. 15 is a flowchart illustrating a method of transmitting information according to another exemplary embodiment of the present disclosure.

Referring to FIG. 15, which is a flowchart illustrating a method of transmitting information according to an exemplary embodiment, on the basis of the embodiment as illustrated in FIG. 14, the method may further include:

In step 14, determining non-shared grant-free uplink transmission configuration information for the invalid participating UE;

As in the above example, it is still assumed that UE1 is an invalid participating UE. After the base station remove the UE1 from the original participating terminal group, it can instead configure grant-free uplink transmission resources, that is, non-shared grant-free uplink transmission resources, for the UE1 separately, so as to obtain non-shared grant-free uplink transmission configuration information for the UE1.

In an embodiment of the present disclosure, the base station stores a historical grant-free uplink transmission configuration information of the invalid participating UE, and in a case that the base station separately configures the non-shared grant-free uplink transmission resource for the invalid participating terminal such as the UE1, the foregoing historical grant-free uplink transmission configuration information may be reused, that is, re-determining the historical grant-free uplink transmission configuration information as the non-shared grant-free uplink transmission configuration information of the UE1.

In step 15, the non-shared grant-free uplink transmission configuration information is notified to the invalid participating UE.

In this disclosure, in a case that the non-shared grant-free uplink transmission configuration information of the invalid participating UE is newly configured by the base station, the step 15 may be: transmitting the non-shared grant-free uplink transmission configuration information to the invalid participating UE. If the non-shared grant-free uplink transmission configuration information of the invalid participating UE is determined by the base station based on the historical grant-free uplink transmission configuration information of the invalid participating terminal, the base station may transmit preset indication information to inform the invalid participating UE of the non-shared grant-free uplink transmission configuration information, wherein the preset indication information, configured to inform the invalid participating UE to Uplink transmission configuration information; wherein the above-mentioned preset indication information is used to inform the invalid participating UE to resume the historical grant-free uplink transmission configuration information.

Regarding the foregoing method embodiments, for the sake of simple description, they are all expressed as a series of actions or a combination of actions, but one of ordinary skill in the art should know that the present disclosure is not limited by the described sequence of actions, because according to the present disclosure, some steps may be performed in other order or at the same time.

Secondly, one of ordinary skill in the art should also know that the embodiments described in the specification are all optional embodiments, and the involved actions and modules are not necessarily required by the present disclosure.

Corresponding to the foregoing method embodiments for achieving application functions, the present disclosure further provides embodiments of devices for achieving application functions and corresponding terminals.

Figure 16:
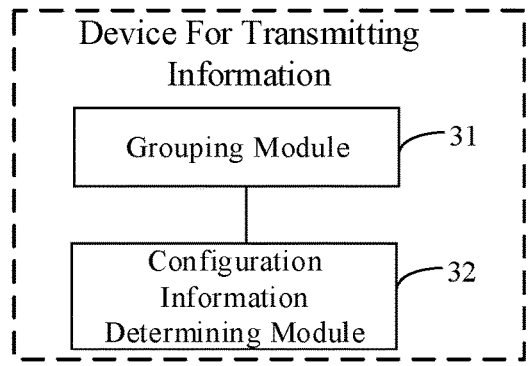
FIG. 16 is a block diagram illustrating a device for transmitting information according to an exemplary embodiment of the present disclosure.

Referring to FIG. 16, which illustrates a block diagram illustrating a device for transmitting information according to an exemplary embodiment of the present disclosure. The device is applicable to a base station, and the device may include:

a grouping module 31, configured to determine a participating terminal group, each participating terminal UE of the participating terminal group shares a same periodic uplink transmission resource in a grant-free uplink transmission period in a shared unlicensed spectrum; and a configuration information determining module 32, configured to determine shared grant-free uplink transmission configuration information for the participating terminal group, wherein the shared grant-free uplink transmission configuration information is configured to instruct each participating terminal of the participating terminal group to perform uplink transmission automatically through a preset periodic uplink transmission resource in an unlicensed spectrum.

Figure 17:
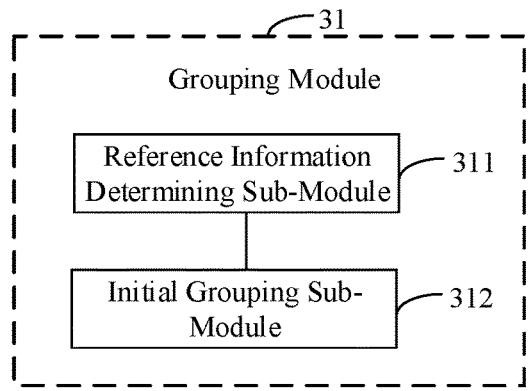
FIG. 17 is a block diagram illustrating a device for transmitting information according to another exemplary embodiment of the present disclosure.

Referring to FIG. 17, which is a block diagram illustrating a device for transmitting information according to another exemplary embodiment of the present disclosure, on the basis of the device embodiment illustrated in FIG. 16, the grouping module 31 may include:

a reference information determining sub-module 311, configured to determine preset transmission reference information of respective terminals when each terminal uses beam forming technology to transmit information in an unlicensed spectrum, where the preset transmission reference information includes: uplink data information to be transmitted, and/or, Location information of the terminal relative to the base station; and an initial grouping sub-module 312, configured to determine, in a case that the preset transmission reference information of at least two of the participating terminals meets a preset grouping condition, an initial participating terminal group according to the at least two terminals.

Figure 18:
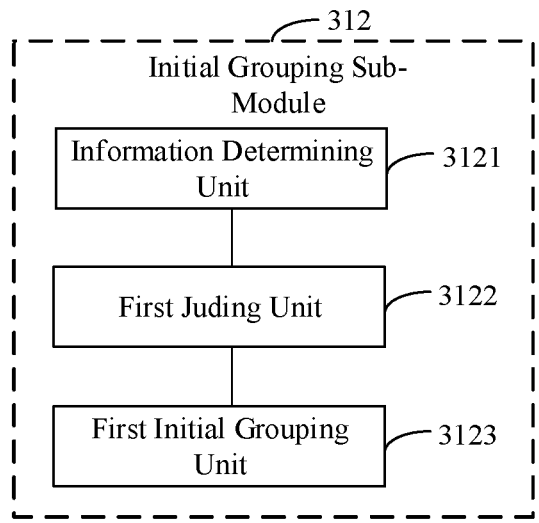
FIG. 18 is a block diagram illustrating a device for transmitting information according to another exemplary embodiment of the present disclosure.

In a device embodiment of the present disclosure, the preset transmission reference information determined by the reference information determining sub-module 311 may include: uplink data information to be transmitted;

Correspondingly, referring to FIG. 18, which is a block diagram of a device for transmitting information according to an exemplary embodiment of the present disclosure, on the basis of the device embodiment as illustrated in FIG. 17, the initial grouping sub-module 312 may include:

an information determining unit 3121, configured to determine grant-free uplink transmission configuration information of each terminal, where the grant-free uplink transmission configuration information includes: a time-frequency range of a grant-free uplink transmission period, and a time-frequency range of a periodic uplink transmission resource in the grant-free uplink transmission period;

a first judging unit 3122, configured to determine, according to the grant-free uplink transmission configuration information, whether a first preset grouping condition is satisfied between the terminals, and the first preset grouping condition includes: time domain ranges of the grant-free uplink transmission periods of the at least two terminals are same or have a multiple relationship, and has a synchronization starting time; and a first initial grouping unit 3123, configured to determine, in a case that the grant-free uplink transmission configuration information of at least two terminals meet the first preset grouping condition, the initial participating terminal group according to the at least two terminals.

Figure 19:
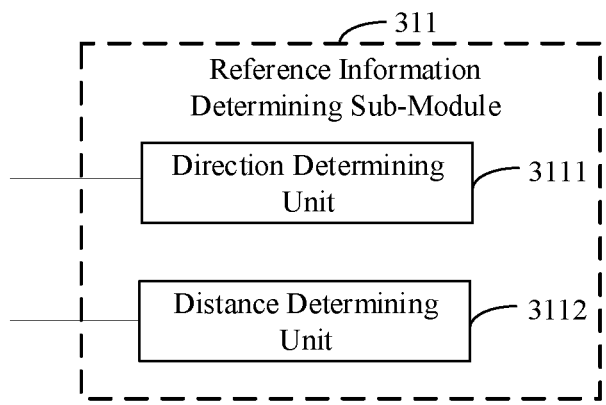
FIG. 19 is a block diagram illustrating a device for transmitting information according to another exemplary embodiment of the present disclosure.

In another device embodiment of the present disclosure, the preset transmission reference information, determined by the reference information determining sub-module 311, may include: position information of the terminal with respect to the base station, and the position information includes direction information and distance information;

Correspondingly, referring to FIG. 19, which is a block diagram of a device for transmitting information according to an exemplary embodiment of the present, on the basis of the device embodiment as illustrated in FIG. 17, the reference information determining sub-module 311 may include:

- a direction determining unit 3111, configured to determine the direction information of each terminal with respect to the base station according to beam information used in a case of communicating with each terminal;
- a distance determining unit 3112, configured to determine, according to a preset distance reference information of each terminal, distance information of each terminal with respect to the base station, wherein the preset distance reference information includes at least one of followings: reference signal received power (RSRP) of downlink reference signal, reference signal received quality (RSRQ) of the downlink reference signal, uplink power control information, Modulation and Coding Scheme (MCS), and timing advance (TA).

Figure 20:
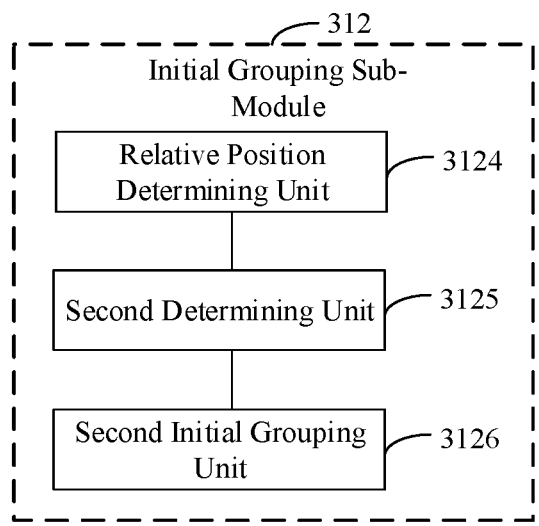
FIG. 20 is a block diagram illustrating a device for transmitting information according to another exemplary embodiment of the present disclosure.

Referring to FIG. 20, which is a block diagram illustrating a device for transmitting information according to another exemplary embodiment of the present disclosure, based on the device embodiment illustrated in FIG. 19, the initial grouping sub-module 312 may include:

- a relative position determining unit 3124, configured to determine, according to position information of respective terminals with respect to the base station, relative position information between the terminals;
- a second determining unit 3125, configured to determine, according to the relative position information between every two terminals, whether a second preset grouping condition is satisfied between the terminals, the second preset grouping condition includes: a direction deviation between the terminals not greater than a preset angle threshold, and a distance between the terminals not greater than a preset distance threshold; and
- a second initial grouping unit 3126, configured to determine, in a case that the relative position information between at least two terminals satisfies the second preset grouping condition, the initial participating terminal group according to the at least two terminals.

In another device embodiment of the present disclosure, the preset transmission reference information, determined by the reference information determining sub-module 311, may include: uplink data information to be transmitted and position information of the terminal relative to the base station.

Figure 21:
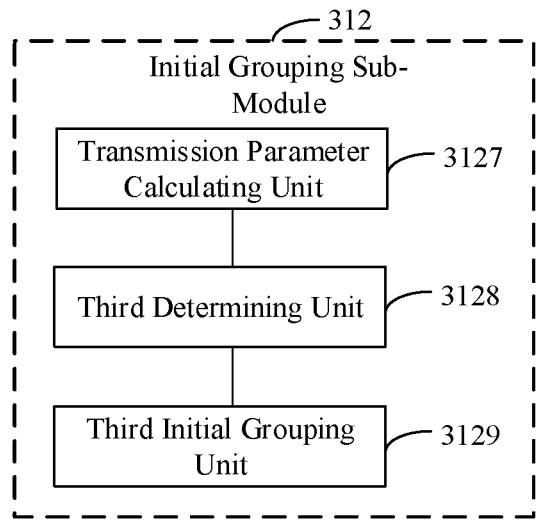
FIG. 21 is a block diagram illustrating a device for transmitting information according to another exemplary embodiment of the present disclosure.

Referring to FIG. 21, which is a block diagram illustrating a device for transmitting information according to another exemplary embodiment of the present disclosure, on the basis of the device embodiment as illustrated in FIG. 17, the initial grouping sub-module 312 may include:

- a transmission parameter calculating unit 3127, configured to calculate an uplink transmission parameter of each of the terminals under a preset strategy according to weights of different preset transmission reference information;
- a third determining unit 3128, configured to determine whether the uplink transmission parameter of each of the terminals satisfies a third preset grouping condition, wherein the third preset grouping condition includes: a difference in the uplink transmission parameter between the terminals is less than a preset threshold; and
- a third initial grouping unit 3129, configured to determine, in a case that the uplink transmission parameter of at least two terminals satisfies the third preset grouping condition, the initial participating terminal group according to the at least two terminals.

In any device according to the foregoing embodiments of the present disclosure, the configuration information determining module 32 may be configured to configure a same grant-free uplink transmission resource in an unlicensed spectrum for the initial participating terminal group, so as to obtain the shared grant-free uplink transmission configuration information.

Figure 22:
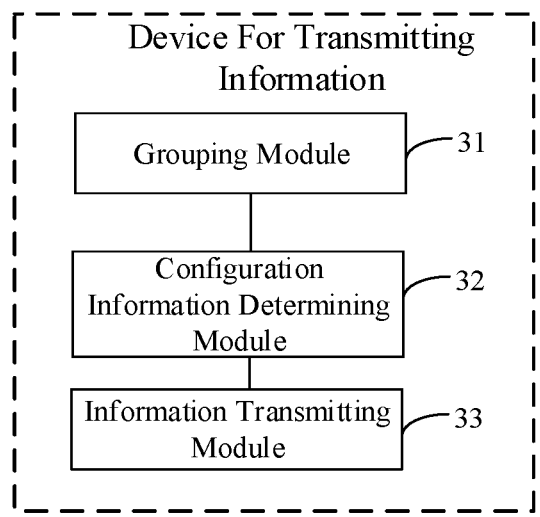
FIG. 22 is a block diagram illustrating a device for transmitting information according to another exemplary embodiment of the present disclosure.

Correspondingly, referring to FIG. 22, which is a block diagram illustrating a device for transmitting information according to another exemplary embodiment of the present disclosure, on the basis of the device embodiment as illustrated in FIG. 16, the device may further include:

- an information transmitting module 33, configured to issue the shared grant-free uplink transmission configuration information to each of the participating UEs of the initial participating terminal group, so that each of the participating UEs performs uplink transmission automatically according to the grant-free uplink transmission configuration information.

Figure 23:
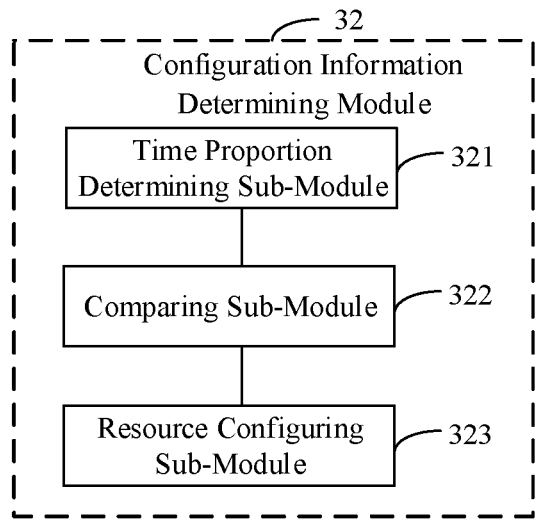
FIG. 23 is a block diagram illustrating a device for transmitting information according to another exemplary embodiment of the present disclosure.

In a device embodiment of the present disclosure, in a case that the initial participating terminal group is a terminal group determined according to the first preset grouping condition;

referring to FIG. 23, which is a block diagram illustrating a device for transmitting information according to another exemplary embodiment, on the basis of the device embodiment as illustrated in FIG. 22, the configuration information determining module 32 may include:

- a time proportion determining sub-module 321, configured to determine, according to original grant-free uplink transmission configuration information of each of the participating terminals, a time proportion of an original grant-free uplink transmission resource within a preset time duration, wherein the preset time duration is not less than a maximum original grant-free uplink transmission period;
- a comparing sub-module 322, configured to determine a target grant-free uplink transmission period corresponding to a maximum time proportion by comparing the time proportion of the original grant-free uplink transmission resource of the respective participating terminals; and
- a resource configuring sub-module 323, configured to configure a grant-free uplink transmission resource in an unlicensed spectrum for the participating terminal group according to the target grant-free uplink transmission period.

Figure 24:
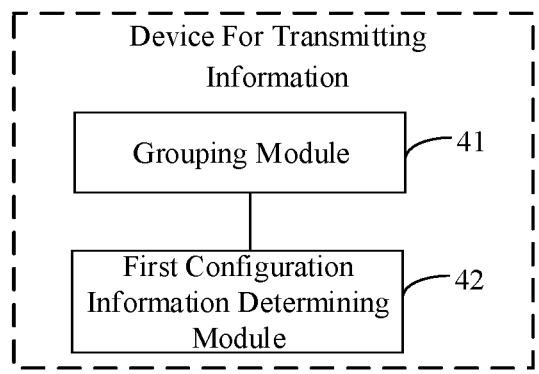
FIG. 24 is a block diagram illustrating a device for transmitting information according to an exemplary embodiment of the present disclosure.

The present disclosure further provides another device for transmitting information, which is applicable to a base station. Referring to FIG. 24, which is a block diagram illustrating a device for transmitting information according to an exemplary embodiment of the present disclosure, the device may include:

- a grouping module 41, configured to determine a participating terminal group, each participating terminal UE of the participating terminal group sharing a periodic uplink transmission resource in a same grant-free uplink transmission period in an unlicensed spectrum; and
- a first configuration information determining module 42, configured to determine shared grant-free uplink transmission configuration information for the participating terminal group, wherein the shared authorization-free uplink transmission configuration information is configured to instruct each participating terminal of the participating terminal group to perform uplink transmission automatically according to a preset periodic uplink transmission resource in the unlicensed spectrum.

In another device embodiment of the present disclosure, the first configuration information determining module 42 may be configured to determine shared grant-free uplink transmission configuration information of an original participating terminal group as shared grant-free uplink transmission configuration information of an updated participating terminal group.

Figure 25:
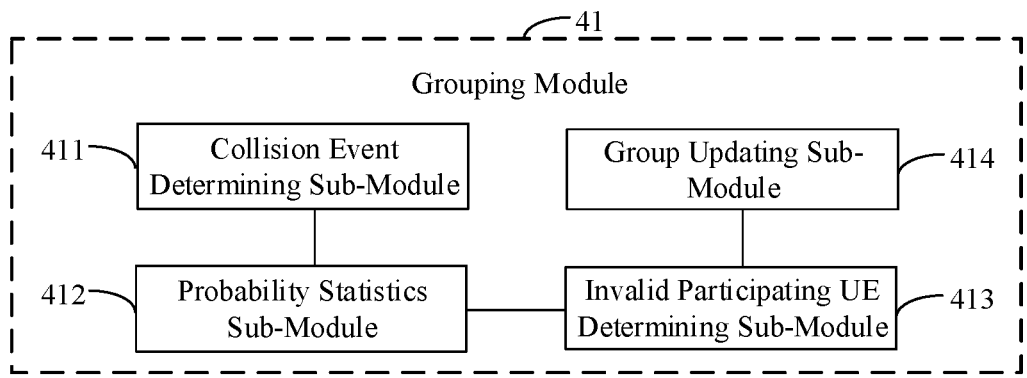
FIG. 25 is a block diagram illustrating a device for transmitting information according to another exemplary embodiment of the present disclosure.

Referring to FIG. 25, which is a block diagram illustrating a device for transmitting information according to another exemplary embodiment of the present disclosure, on the basis of the device embodiment as illustrated in FIG. 24, the grouping module 41 may include:

a collision event determining sub-module 411, configured to determine a transmission collision event according to the original participating terminal group, wherein the transmission collision event indicates an event in which at least two of the participating UEs of the original participating terminal group succeed in an LBT detection for channel collision avoidance and fail in transmission through a same uplink transmission resource;

a probability statistics sub-module 412, configured to count a probability that a transmission collision event occurs between respective participating UEs within a preset time range;

an invalid participating UE determining sub-module 413, configured to determine, in a case that a probability that a transmission collision event occurs to one or more of the participating UEs of the original participating terminal group is greater than or equal to a preset threshold, each of the one or more participating UEs as an invalid participating UE; and a group updating sub-module 414, configured to obtain an updated participating terminal group by releasing sharing of the periodic uplink transmission resource for the invalid participating UE.

In a device embodiment of the present disclosure, the collision event determining sub-module 411 may be configured to determine, according to uplink transmission analysis information of each of the participating UE of the original participating terminal group, the transmission collision event.

Figure 26:
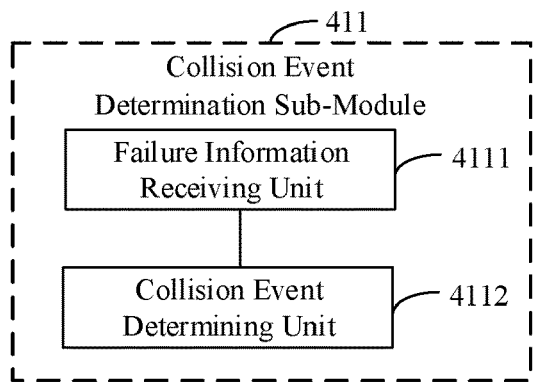
FIG. 26 is a block diagram illustrating a device for transmitting information according to another exemplary embodiment of the present disclosure.

Refer to FIG. 26, which is a block diagram illustrating a device for transmitting information according to another exemplary embodiment. Based on the apparatus embodiment as illustrated in in FIG. 25, the collision event determination sub-module 411 may include:

a failure information receiving unit 4111, configured to receive uplink transmission failure information from each of the participating UEs of the original participating terminal group, wherein the uplink transmission failure information includes: LBT detection success information and a time-frequency location information of uplink transmission failure;

a collision event determining unit 4112, configured to determine, according to the time-frequency location information of failed uplink transmission of each of the participating UEs, the transmission collision event.

Figure 27:
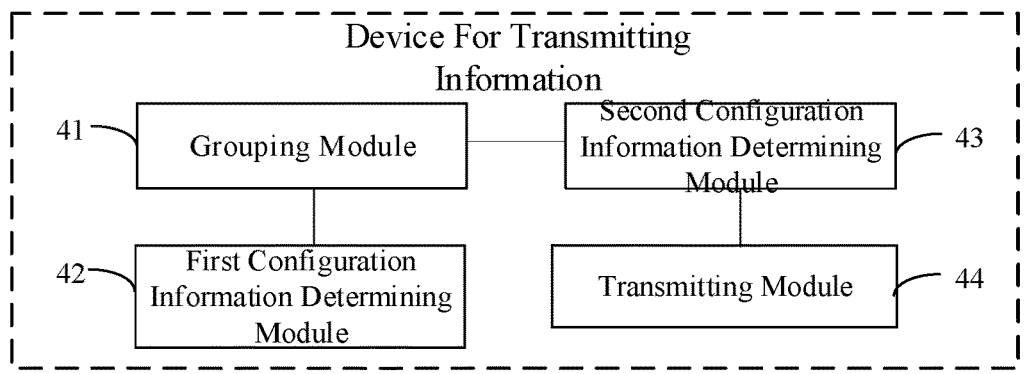
FIG. 27 is a block diagram illustrating a device for transmitting information according to another exemplary embodiment of the present disclosure.

Refer to FIG. 27, which is a block diagram illustrating another device for transmitting information according to an exemplary embodiment of the present disclosure, based on the device embodiment as illustrated in FIG. 25, the device may further include:

a second configuration information determining module 43, configured to determine non-shared grant-free uplink transmission configuration information for the invalid participating UE; and a transmitting module 44, configured to notify the invalid participating UE of the non-shared grant-free uplink transmission configuration information.

Regarding the device embodiments, since it substantially corresponds to the method embodiment, the relevant part may be referred to the part of the description of the method embodiments. The device embodiments described above are merely illustrative. The units described above as separate components may or may not be physically separated, and the components displayed as units may or may not be physical units, that is, they may be located in one place, or it may be distributed on multiple network units. Some or all of the modules may be selected according to actual requirement to achieve the objectives of the solutions according to the present disclosure. One of ordinary skill in the art can understand and implement the present disclosure without creative work.

Correspondingly, one aspect provides a base station, including:

a processor;

memory, configured to store instructions executable by the processor;

wherein, the processor is configured to:

determine a participating terminal group, each participating terminal UE of the participating terminal group sharing a periodic uplink transmission resource in the same grant-free uplink transmission period in an unlicensed spectrum; and determine shared grant-free uplink transmission configuration information for the participating terminal group, wherein the shared grant-free uplink transmission configuration information is configured to instruct each participating terminal of the participating terminal group to perform uplink transmission automatically according to a preset periodic uplink transmission resource in the unlicensed spectrum.

Figure 28:
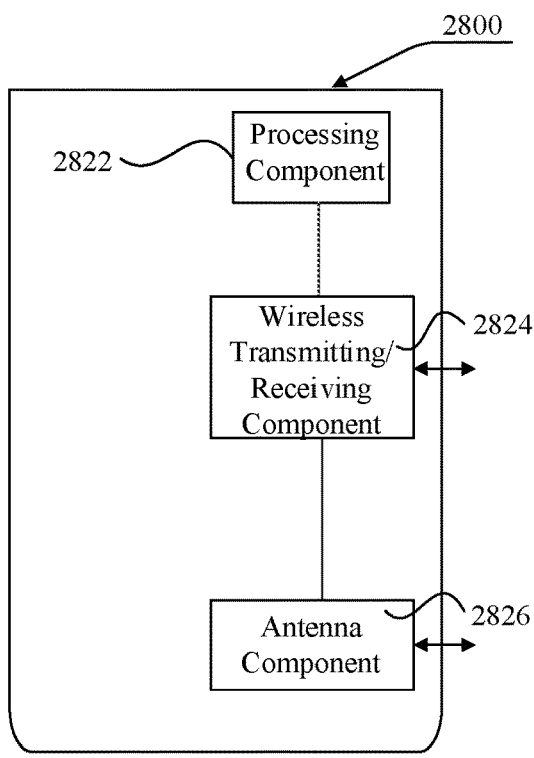
FIG. 28 is a schematic structural diagram illustrating a base station according to an exemplary embodiment of the present disclosure.

As illustrated in FIG. 28, which is a schematic structural diagram illustrating a base station 2800 according to an exemplary embodiment of the present disclosure. Referring to FIG. 28, the base station 2800 includes a processing component 2822, a wireless transmitting/receiving component 2824, an antenna component 2828, and a signal processing part specific to a wireless interface. The processing component 2822 may further include one or more processors.

One of the processors of the processing component 2822 may be configured to:

determine a participating terminal group, each participating terminal UE of the participating terminal group sharing a periodic uplink transmission resource in a same grant-free uplink transmission period in an unlicensed spectrum;

determine shared grant-free uplink transmission configuration information for the participating terminal group, wherein the shared grant-free uplink transmission configuration information is configured to instruct each participating terminal of the participating terminal group to perform uplink transmission automatically according to a preset periodic uplink transmission resource in the unlicensed spectrum.

In an exemplary embodiment, there is further provided a non-transitory computer-readable storage medium including instructions, on which computer instructions are stored. The computer instructions may be executed by the processing component 2822 of the base station 2800 to complete operations of any one of the methods of transmitting information according FIGS. 1-15. For example, the non-transitory computer-readable storage medium may be ROM, random access memory (RAM), CD-ROM, magnetic tape, floppy disk, optical data storage device, etc.

In an embodiment of the present disclosure, the preset transmission reference information comprises uplink data information to be transmitted;
  determining the initial participating terminal group according to the at least two terminals in response to that the preset transmission reference information of the at least two terminals satisfies the preset grouping condition includes:
  determining grant-free uplink transmission configuration information of each terminal, wherein the grant-free uplink transmission configuration information includes: a time-frequency range of the grant-free uplink transmission period, and a time-frequency range of the periodic uplink transmission resource in the grant-free uplink transmission period;
  determining, according to the grant-free uplink transmission configuration information, whether a first preset grouping condition is satisfied between respective terminals, wherein the first preset grouping condition comprises that time-domain ranges of grant-free uplink transmission periods of at least two terminals are same or have a multiple relationship, and have a synchronization starting time; and
  determining the initial participating terminal group according to the at least two terminals in response to that the grant-free uplink transmission configuration information of the at least two terminals satisfies the first preset grouping condition.

In an embodiment of the present disclosure, the preset transmission reference information comprises position information of the terminal with respect to the base station, and the position information comprises direction information and distance information;
  determining the preset transmission reference information of each terminal in a case of transmitting information in the unlicensed spectrum through beam forming technology comprises:
  determining the direction information of each terminal with respect to the base station according to beam information used in a case of communicating with each terminal;
  determining the distance information of each terminal with respect to the base station according to a preset distance reference information of each terminal, wherein the preset distance reference information comprises at least one of followings: reference signal received power (RSRP) of downlink reference signal, reference signal received quality (RSRQ) of the downlink reference signal, uplink power control information, Modulation and Coding Scheme (MCS), and timer advance (TA).

In an embodiment of the present disclosure, determining the initial participating terminal group according to the at least two terminals in response to that the preset transmission reference information of at least terminals satisfy the present grouping condition includes:

determining relative position information between respective terminals according to the position information of the respective terminals with respect to the base station;
  determining, according to the relative position information between the respective terminals, whether at least two terminals meet a second preset grouping condition is satisfied between at least two terminals, wherein the second preset grouping condition includes: direction deviation between the terminals not greater than a preset angle threshold, and a distance between the terminals not greater than a preset distance threshold;
  determining the initial participating terminal group according to the at least two terminals in response to that the relative position information between at least two terminals meets the second preset grouping condition.

In an embodiment of the present disclosure, the preset transmission reference information comprises uplink data information to be transmitted and position information of the terminal with respect to the base station;
  determining an initial participating terminal group according to at least two terminals in response to that the preset transmission reference information of the at least two terminals satisfies a preset grouping condition includes:
  calculating an uplink transmission parameter of each terminal according to a preset strategy according to weights of different preset transmission reference information;
  determining whether the uplink transmission parameter of each terminal satisfies a third preset grouping condition, wherein the third preset grouping condition comprises: a difference in uplink transmission parameter between the terminals is less than a preset threshold;
  determining the initial participating terminal group according to the at least two terminals in response to that the uplink transmission parameter of at least two terminals satisfies the third preset grouping condition.

In an embodiment of the present disclosure, determining the shared grant-free uplink transmission configuration information for the participating terminal group includes:
  configuring a same grant-free uplink transmission resource in the unlicensed spectrum for the initial participating terminal group, so as to obtain the shared grant-free uplink transmission configuration information;
  the method further includes:
  issuing the shared grant-free uplink transmission configuration information to each of the participating UEs of the initial participating terminal group, so that each of the participating UEs performs uplink transmission automatically according to the grant-free uplink transmission configuration information.

In an embodiment of the present disclosure, in response to that the initial participating terminal group is a terminal group determined according to the first preset grouping condition;
  configuring the same grant-free uplink transmission resource in the unlicensed spectrum for the participating terminal group includes:
  determining a time proportion of an original grant-free uplink transmission resource within a preset time duration according to an original grant-free uplink transmission configuration information of each of the participating terminals, wherein the preset time duration is not less than a maximum original grant-free uplink transmission period;

determining a target grant-free uplink transmission period corresponding to a maximum time proportion by comparing the duration proportions of the original grant-free uplink transmission resources of respective participating terminals; and configuring a same grant-free uplink transmission resource in the unlicensed spectrum for the participating terminal group according to the target grant-free uplink transmission period.

In an embodiment of the present disclosure, determining the participating terminal group includes:

determining a transmission collision event based on an original participating UE group, wherein the transmission collision event indicates an event in which at least two participating UEs of the participating UEs group succeed in LBT detection for channel collision avoidance at the same time and fail in performing uplink transmission through a same uplink transmission resource;

counting a probability that the transmission collision event occurs between respective participating UEs within a preset time range;

determining the one or more participating UEs as an invalid participating UEs in response to that the probability that a transmission collision event occurs to one or more participating UEs of the original participating terminal group is greater than or equal to a preset threshold; and obtaining an updated participating terminal group by releasing sharing the periodic uplink transmission resource with the invalid participating UE.

In an embodiment of the present disclosure, determining the transmission collision event based on the original participating terminal group includes:

determining the transmission collision event based on the uplink transmission analysis information of each of the participating UEs of the original participating terminal group.

In an embodiment of the present disclosure, determining the transmission collision event based on the original participating terminal group includes:

receiving uplink transmission failure information from each of the participating UEs of the original participating terminal group, wherein the uplink transmission failure information includes: LBT detection success information and time-frequency location information of uplink transmission failure; and determining the transmission collision event according to the time-frequency location information of the uplink transmission failure of respective participating UEs.

In an embodiment of the present disclosure, determining the shared grant-free uplink transmission configuration information for the participating terminal group includes:

determining the shared grant-free uplink transmission configuration information of the original participating terminal group as shared grant-free uplink transmission configuration information of the updated participating terminal group.

In an embodiment of the present disclosure, the method further includes:

determining non-shared grant-free uplink transmission configuration information for the invalid participating UE; and notifying the invalid participating UE of the non-shared grant-free uplink transmission configuration information.

In an embodiment of the present disclosure, the grouping module includes:

a reference information determining sub-module, configured to determine preset transmission reference information of each terminal in a case of transmitting information in an unlicensed spectrum through beam forming technology, the preset transmission reference information comprising at least one of uplink data information to be transmitted and position information of each terminal with respect to the base station; and an initial grouping sub-module, configured to determine, in response to that the preset transmission reference information of at least two terminals satisfied a preset grouping condition, the initial participating terminal group according to the at least two terminals.

In an embodiment of the present disclosure, the preset transmission reference information comprises: uplink data information to be transmitted;

the initial grouping sub-module includes:

an information determining unit, configured to determine grant-free uplink transmission configuration information for each terminal, wherein the grant-free uplink transmission configuration information comprises a time-frequency range of a grant-free uplink transmission period, and a time-frequency range of a periodic uplink transmission resource in the grant-free uplink transmission period;

a first judging unit, configured to determine whether a first preset grouping condition is satisfied between the terminals according to the grant-free uplink transmission configuration information, the first preset grouping condition comprising: time-domain ranges of the grant-free uplink transmission periods of the at least two terminals being same or having a multiple relationship, and having a synchronization starting time; and a first initial grouping unit, configured to determine, in response to that the grant-free uplink transmission configuration information of the at least two terminals satisfies the first preset grouping condition, the initial participating terminal group according to the at least two terminals.

In an embodiment of the present disclosure, the preset transmission reference information comprises position information of the terminal relative to the base station, and the position information comprises direction information and distance information;

the reference information determining sub-module including:

a direction determining unit, configured to determine the direction information of each terminal with respect to the base station according to beam information used in a case of communicating with each terminal; and a distance determining unit, configured to determine distance information of each terminal with respect to the base station according to preset distance reference information of each terminal, and the preset distance reference information comprises at least one of followings: Reference Signal Received Power (RSRP), Reference Signal Received Quality (RSRQ) of downlink reference signal, uplink power control information, Modulation and Coding Scheme (MCS), and Timer Advance (TA).

In an embodiment of the present disclosure, the initial grouping sub-module includes:

a relative position determining unit, configured to determine relative position information between the terminals according to the position information of each terminal with respect to the base station;

a second determining unit, configured to determine, according to the relative position information between the terminals, whether a second preset grouping condition is satisfied between at least two terminals, wherein the second preset grouping condition comprises: a direction deviation between the terminals not greater than a preset angle threshold and a distance between the terminals not greater than a preset distance threshold; and a second initial grouping unit, configured to determine, in response to that the relative position information between at least two terminals satisfies the second preset grouping condition, the initial participating terminal group according to the at least two terminals.

In an embodiment of the present disclosure, the preset transmission reference information includes uplink data information to be transmitted and position information of the terminal with respect to the base station;

the initial grouping sub-module includes:

a transmission parameter calculating unit, configured to calculate the uplink transmission parameter of respective terminals according to a preset strategy according to weights of different preset transmission reference information;

a third determining unit, configured to determine whether the uplink transmission parameter of the respective terminals meet a third preset grouping condition, where the third preset grouping condition comprises: a difference between the uplink transmission parameters of the respective terminal is less than a preset threshold; and a third initial grouping unit, configured to determine, in response to that the uplink transmission parameter of at least two terminals satisfies a preset grouping condition, whether the uplink transmission parameters of the respective terminals satisfy the third preset grouping condition, the initial participating terminal group according to the at least two terminals.

In an embodiment of the present disclosure, the configuration information determining module is configured to configure a same grant-free uplink transmission resource in the unlicensed spectrum for the initial participating terminal group, so as to obtain the shared grant-free uplink transmission configuration information;

the device further includes:

an information transmitting module, configured to transmit the shared grant-free uplink transmission configuration information to each of the participating UEs of the initial participating terminal group, so that each of the participating UE performs uplink transmission automatically according to the grant-free uplink transmission configuration information.

In an embodiment of the present disclosure, in response to that the initial participating terminal group is a terminal group determined according to the first preset grouping condition;

the configuration information determining module comprises:

a time proportion determining sub-module, configured to determine, according to an original grant-free uplink transmission configuration information of each of the participating terminals, a time proportion of an original grant-free uplink transmission resource within a preset time duration, wherein the preset time duration is not greater than a maximum original grant-free uplink transmission period;

a comparing sub-module, configured to determine a target grant-free uplink transmission period corresponding to a maximum time proportion by comparing the time proportion of the original grant-free uplink transmission resource each of the participating terminals; and a resource configuration sub-module, configured to configure a same grant-free uplink transmission resource in the unlicensed for the participating terminals according to the target grant-free uplink transmission period.

In an embodiment of the present disclosure, the grouping module includes:

a collision event determining sub-module, configured to determine a transmission collision event based on the original participating terminal group, wherein the transmission collision event indicates an event in which at least two participating UEs succeed in LBT detection for channel collision avoidance at the same time and fail in transmission through a same uplink transmission resource;

a probability statistics sub-module, configured to count a probability that a transmission collision event occurs to each of the participating UEs within a preset time range;

an invalid participating UE determining sub-module, configured to, in response to that the probability that the transmission collision event occurs to one or more of the participating UEs in the original participating terminal group is greater than or equal to a preset threshold, determine the one or more participating UE as an invalid participating UE; and a group updating sub-module, configured to obtain updated participating terminal group by releasing sharing the periodic uplink transmission resource with the invalid participating UE.

In an embodiment of the present disclosure, the collision event determination sub-module, configured to determine the transmission collision based on the uplink transmission analysis information of each of the participating UEs in the original participating terminal group event.

In an embodiment of the present disclosure, the collision event determination sub-module includes:

a failure information receiving unit, configured to receive uplink transmission failure information from each of the participating UEs of the original participating terminal group, wherein the uplink transmission failure information comprises: LBT detection success information and time-frequency location information of uplink transmission failure; and a collision event determining unit, configured to determine the transmission collision event according to the time-frequency location information of the uplink transmission failure of each of the participating UEs.

In an embodiment of the present disclosure, the first configuration information determining module is configured to determine the shared grant-free uplink transmission configuration information of the original participating terminal group as shared grant-free uplink transmission configuration information of the updated participating terminal group.

In an embodiment of the present disclosure, the device further includes:

a second configuration information determining module, configured to determine non-shared grant-free uplink transmission configuration information for the invalid participating UE; and a transmitting module, configured to notify the invalid participating UE of the non-shared grant-free uplink transmission configuration information.

One of ordinary skill in the art will easily think of other embodiments of the present disclosure after considering the specification and practicing the disclosure disclosed herein. This application is intended to cover any variants, applications, or modifications of the present disclosure. These variants, applications, or modifications follow the general principles of the present disclosure and include common knowledge or conventional technical means of the art that are not disclosed in the present disclosure. The description and the embodiments are to be regarded as exemplary only, and the true scope and spirit of the present disclosure are set forth in the appended claims.

It should be understood that the present disclosure is not limited to the exact structure that has been described above and illustrated in the drawings, and various modifications and changes can be made without departing from its scope. The scope of the present disclosure is only defined by the appended claims.

The invention claimed is:

1. A method of transmitting information, comprising:
   determining, by a base station, a participating terminal group, each participating terminal of the participating terminal group sharing a periodic uplink transmission resource in the same grant-free uplink transmission period in an unlicensed spectrum; and
   determining, by the base station, shared grant-free uplink transmission configuration information for the participating terminal group, wherein the shared grant-free uplink transmission configuration information is configured to instruct each participating terminal of the participating terminal group to perform uplink transmission automatically according to a preset periodic uplink transmission resource in the unlicensed spectrum,
   wherein determining the participating terminal group comprises:
   determining a preset transmission reference information of each terminal in a case of transmitting information in the unlicensed spectrum through beam forming technology; and
   determining an initial participating terminal group according to at least two terminals in response to that the preset transmission reference information of the at least two terminals satisfies a preset grouping condition,
   wherein the preset transmission reference information comprises uplink data information to be transmitted, and determining the initial participating terminal group according to the at least two terminals in response to that the preset transmission reference information of the at least two terminals satisfies the preset grouping condition comprises:
      determining grant-free uplink transmission configuration information of each terminal, wherein the grant-free uplink transmission configuration information comprises: a time-frequency range of the grant-free uplink transmission period, and a time-frequency range of the periodic uplink transmission resource in the grant-free uplink transmission period;
      determining, according to the grant-free uplink transmission configuration information, whether a first preset grouping condition is satisfied between respective terminals, wherein the first preset grouping condition comprises that time-domain ranges of grant-free uplink transmission periods of the at least two terminals are same or have a multiple relationship, and have a synchronization starting time; and
      determining the initial participating terminal group according to the at least two terminals in response to that the grant-free uplink transmission configuration information of the at least two terminals satisfies the first preset grouping condition, or
   wherein the preset transmission reference information comprises position information of a terminal with respect to the base station, the position information comprises direction information and distance information, and determining the initial participating terminal group according to the at least two terminals in response to that the preset transmission reference information of the at least two terminals satisfies the present grouping condition comprises:
      determining relative position information between respective terminals according to the position information of the respective terminals with respect to the base station;
      determining, according to the relative position information between the respective terminals, whether relative position information between the at least two terminals meets the second preset grouping condition, wherein the second preset grouping condition comprises that direction deviation between the respective terminals is not greater than a preset angle threshold, and a distance between the respective terminals is not greater than a preset distance threshold; and
      determining the initial participating terminal group according to the at least two terminals in response to that the relative position information between the at least two terminals meets the second preset grouping condition, or
   wherein the preset transmission reference information comprises uplink data information to be transmitted and position information of the terminal with respect to the base station, and determining the initial participating terminal group according to the at least two terminals in response to that the preset transmission reference information of the at least two terminals satisfies the preset grouping condition comprises:
      calculating an uplink transmission parameter of each terminal according to a preset strategy according to weights of different preset transmission reference information;
      determining whether the uplink transmission parameter of each terminal satisfies a third preset grouping condition, wherein the third preset grouping condition comprises: a difference in uplink transmission parameter between the terminals is less than a preset threshold; and
      determining the initial participating terminal group according to the at least two terminals in response to that the uplink transmission parameter of the at least two terminals satisfies the third preset grouping condition.

2. The method according to claim 1, wherein determining the shared grant-free uplink transmission configuration information for the participating terminal group comprises:
   configuring a same grant-free uplink transmission resource in the unlicensed spectrum for the initial participating terminal group, so as to obtain the shared grant-free uplink transmission configuration information;
   the method further comprises:
   issuing the shared grant-free uplink transmission configuration information to each of the participating terminals of the initial participating terminal group, so that each of the participating terminals performs uplink transmission automatically according to the grant-free uplink transmission configuration information.

3. The method according to claim 1, wherein determining a preset transmission reference information of each terminal in a case of transmitting information in the unlicensed spectrum through beam forming technology comprises:
determining the direction information of each terminal with respect to the base station according to beam information used in a case of communicating with each terminal; and
determining the distance information of each terminal with respect to the base station according to a preset distance reference information of each terminal, wherein the preset distance reference information comprises at least one of followings: reference signal received power (RSRP) of downlink reference signal, reference signal received quality (RSRQ) of the downlink reference signal, uplink power control information, Modulation and Coding Scheme (MCS), and timer advance (TA).

4. The method according to claim 3, wherein determining the shared grant-free uplink transmission configuration information for the participating terminal group comprises:
configuring a same grant-free uplink transmission resource in the unlicensed spectrum for the initial participating terminal group, so as to obtain the shared grant-free uplink transmission configuration information;
the method further comprises:
issuing the shared grant-free uplink transmission configuration information to each of the participating terminals of the initial participating terminal group, so that each of the participating terminals performs uplink transmission automatically according to the grant-free uplink transmission configuration information.

5. The method according to claim 1, wherein determining the shared grant-free uplink transmission configuration information for the participating terminal group comprises:
configuring a same grant-free uplink transmission resource in the unlicensed spectrum for the initial participating terminal group, so as to obtain the shared grant-free uplink transmission configuration information;
the method further comprises:
issuing the shared grant-free uplink transmission configuration information to each of the participating terminal of the initial participating terminal group, so that each of the participating terminal performs uplink transmission automatically according to the grant-free uplink transmission configuration information.

6. The method according to claim 5, wherein in response to that the initial participating terminal group is a terminal group determined according to the first preset grouping condition;
configuring the same grant-free uplink transmission resource in the unlicensed spectrum for the participating terminal group comprises:
determine a time proportion of an original grant-free uplink transmission resource within a preset time duration according to an original grant-free uplink transmission configuration information of each of the participating terminals, wherein the preset time duration is not less than a maximum original grant-free uplink transmission period;
determining a target grant-free uplink transmission period corresponding to a maximum time proportion by comparing the duration proportions of the original grant-free uplink transmission resources of respective participating terminals; and
configuring a same grant-free uplink transmission resource in the unlicensed spectrum for the participating terminal group according to the target grant-free uplink transmission period.

7. A method of transmitting information, comprising:
determining, by a base station, a participating terminal group, each participating user equipment (UE) of the participating terminal group sharing a periodic uplink transmission resource in a same grant-free uplink transmission period in an unlicensed spectrum; and
determining, by the base station, shared grant-free uplink transmission configuration information for the participating terminal group, wherein the shared grant-free uplink transmission configuration information is configured to instruct each participating terminal of the participating terminal group to perform uplink transmission automatically in according to a preset periodic uplink transmission resource in the unlicensed spectrum,
wherein determining the participating terminal group comprises:
determining a transmission collision event based on an original participating UE group, wherein the transmission collision event indicates an event in which at least two participating UEs of the participating UEs group succeed in LBT detection for channel collision avoidance at the same time and fail in performing uplink transmission through a same uplink transmission resource;
counting a probability that the transmission collision event occurs between respective participating UEs within a preset time range;
determining the one or more participating UEs as an invalid participating UEs in response to that the probability that a transmission collision event occurs to one or more participating UEs of the original participating terminal group is greater than or equal to a preset threshold; and
obtaining an updated participating terminal group by releasing sharing the periodic uplink transmission resource with the invalid participating UE.

8. The method according to claim 7, wherein determining the transmission collision event based on the original participating terminal group comprises:
determining the transmission collision event based on the uplink transmission analysis information of each of the participating UEs of the original participating terminal group.

9. The method according to claim 8, wherein the method further comprises:
determining non-shared grant-free uplink transmission configuration information for the invalid participating UE; and
notifying the invalid participating UE of the non-shared grant-free uplink transmission configuration information.

10. The method of claim 7, wherein determining the transmission collision event based on the original participating terminal group comprises:
receiving uplink transmission failure information from each of the participating UEs of the original participating terminal group, where the uplink transmission failure information includes: LBT detection success information and time-frequency location information of uplink transmission failure; and determining the transmission collision event according to the time-frequency location information of the uplink transmission failure of respective participating UEs.

11. The method according to claim 7, wherein determining the shared grant-free uplink transmission configuration information for the participating terminal group comprises:

determining the shared grant-free uplink transmission configuration information of the original participating terminal group as shared grant-free uplink transmission configuration information of the updated participating terminal group.

12. The method according to claim 7, wherein the method further comprises:

determining non-shared grant-free uplink transmission configuration information for the invalid participating UE; and notifying the invalid participating UE of the non-shared grant-free uplink transmission configuration information.

13. A non-transitory computer-readable storage medium having computer instructions stored thereon, wherein, in response to the instructions are executed by a processor, operations of the method according to claim 1 are implemented.

14. A non-transitory computer-readable storage medium having computer instructions stored thereon, wherein, in response to that the instructions are executed by a processor, operations of the method according to claim 7 are implemented.

15. A base station, comprising:

a processor;

memory, configured to store instructions executable by the processor;

wherein, the processor is configured to:

determine a participating terminal group, each participating terminal of the participating terminal group sharing a periodic uplink transmission resource in a same grant-free uplink transmission period in an unlicensed spectrum; and determine shared grant-free uplink transmission configuration information for the participating terminal group, wherein the shared grant-free uplink transmission configuration information is configured to instruct each participating terminal of the participating terminal group to perform uplink transmission automatically according to a preset periodic uplink transmission resource in the unlicensed spectrums, wherein determine the participating terminal group comprises:

determining a preset transmission reference information of each terminal in a case of transmitting information in the unlicensed spectrum through beam forming technology; and determining an initial participating terminal group according to at least two terminals in response to that the preset transmission reference information of the at least two terminals satisfies a preset grouping condition, wherein the preset transmission reference information comprises uplink data information to be transmitted, and determining the initial participating terminal group according to the at least two terminals in response to that the preset transmission reference information of the at least two terminals satisfies the preset grouping condition comprises:

determining grant-free uplink transmission configuration information of each terminal, wherein the grant-free uplink transmission configuration information comprises: a time-frequency range of the grant-free uplink transmission period, and a time-frequency range of the periodic uplink transmission resource in the grant-free uplink transmission period;

determining, according to the grant-free uplink transmission configuration information, whether a first preset grouping condition is satisfied between respective terminals, wherein the first preset grouping condition comprises that time-domain ranges of grant-free uplink transmission periods of the at least two terminals are same or have a multiple relationship, and have a synchronization starting time; and determining the initial participating terminal group according to the at least two terminals in response to that the grant-free uplink transmission configuration information of the at least two terminals satisfies the first preset grouping condition, or wherein the preset transmission reference information comprises position information of a terminal with respect to the base station, the position information comprises direction information and distance information, and determining the initial participating terminal group according to the at least two terminals in response to that the preset transmission reference information of the at least two terminals satisfies the present grouping condition comprises:

determining relative position information between respective terminals according to the position information of the respective terminals with respect to the base station;

determining, according to the relative position information between the respective terminals, whether relative position information between the at least two terminals meets the second preset grouping condition, wherein the second preset grouping condition comprises that direction deviation between the respective terminals is not greater than a preset angle threshold, and a distance between the respective terminals is not greater than a preset distance threshold; and determining the initial participating terminal group according to the at least two terminals in response to that the relative position information between the at least two terminals meets the second preset grouping condition, or wherein the preset transmission reference information comprises uplink data information to be transmitted and position information of the terminal with respect to the base station, and determining the initial participating terminal group according to the at least two terminals in response to that the preset transmission reference information of the at least two terminals satisfies the preset grouping condition comprises:

calculating an uplink transmission parameter of each terminal according to a preset strategy according to weights of different preset transmission reference information;

determining whether the uplink transmission parameter of each terminal satisfies a third preset grouping condition, wherein the third preset grouping condition comprises: a difference in uplink transmission parameter between the terminals is less than a preset threshold; and determining the initial participating terminal group according to the at least two terminals in response to that the uplink transmission parameter of the at least two terminals satisfies the third preset grouping condition.

\* \* \* \* \*